United States Patent
Yamazaki et al.

(10) Patent No.: US 11,370,910 B2
(45) Date of Patent: *Jun. 28, 2022

(54) POLYCARBONATE RESIN COMPOSITION AND MOLDED BODY

(71) Applicant: IDEMITSU KOSAN CO., LTD., Tokyo (JP)

(72) Inventors: Yasunobu Yamazaki, Chiba (JP); Naoto Okubo, Chiba (JP); Toshio Isozaki, Chiba (JP); Takahiro Torii, Chiba (JP)

(73) Assignee: IDEMITSU KOSAN CO., LTD., Tokyo (JP)

( * ) Notice: Subject to any disclaimer, the term of this patent is extended or adjusted under 35 U.S.C. 154(b) by 244 days.

This patent is subject to a terminal disclaimer.

(21) Appl. No.: 16/499,208

(22) PCT Filed: Mar. 30, 2018

(86) PCT No.: PCT/JP2018/013752
§ 371 (c)(1),
(2) Date: Sep. 27, 2019

(87) PCT Pub. No.: WO2018/181947
PCT Pub. Date: Oct. 4, 2018

(65) Prior Publication Data
US 2021/0108072 A1    Apr. 15, 2021

(30) Foreign Application Priority Data

Mar. 30, 2017 (JP) .............................. JP2017-066841

(51) Int. Cl.
C08L 69/00 (2006.01)
C08K 5/103 (2006.01)
(Continued)

(52) U.S. Cl.
CPC .............. *C08L 69/00* (2013.01); *C08G 64/06* (2013.01); *C08K 5/005* (2013.01); *C08K 5/101* (2013.01);
(Continued)

(58) Field of Classification Search
CPC ...... C08K 5/526; C08K 5/527; C08K 5/1515; C08L 69/00
See application file for complete search history.

(56) References Cited

U.S. PATENT DOCUMENTS

2008/0128928 A1  6/2008  Cojocariu et al.
2009/0186208 A1  7/2009  Ishikawa et al.
(Continued)

FOREIGN PATENT DOCUMENTS

CN    1449429 A    10/2003
CN    101437896 A    5/2009
(Continued)

OTHER PUBLICATIONS

Google patents translation of WO 2016/129018 (2016, 13 pages).*
(Continued)

*Primary Examiner* — Brieann R Johnston
(74) *Attorney, Agent, or Firm* — Foley & Lardner LLP

(57) ABSTRACT

Provided is a polycarbonate resin composition, including: an aromatic polycarbonate resin (A); an alicyclic epoxy compound (B); a predetermined antioxidant (C); and a predetermined phosphorus compound (D), wherein, with respect to 100 parts by mass of the component (A), a content of the component (B) is 0.01 part by mass or more and 0.1 part by mass or less, a content of the component (C) is 0.01 part by mass or more and 0.1 part by mass or less, and a content of the component (D) is 0.01 part by mass or more and 0.05 part by mass or less.

17 Claims, 1 Drawing Sheet

(51) Int. Cl.

| | |
|---|---|
| *C08K 5/1515* | (2006.01) |
| *C08K 5/526* | (2006.01) |
| *C08K 5/527* | (2006.01) |
| *C08L 63/00* | (2006.01) |
| *C08G 64/06* | (2006.01) |
| *C08K 5/00* | (2006.01) |
| *C08K 5/101* | (2006.01) |
| *G02B 1/04* | (2006.01) |

(52) U.S. Cl.
CPC ............ *C08K 5/103* (2013.01); *C08K 5/1515* (2013.01); *C08K 5/526* (2013.01); *C08K 5/527* (2013.01); *C08L 63/00* (2013.01); *C08L 2201/10* (2013.01); *G02B 1/041* (2013.01); *G02B 1/045* (2013.01)

(56) References Cited

U.S. PATENT DOCUMENTS

| | | | |
|---|---|---|---|
| 2014/0350148 A1 | 11/2014 | Takimoto et al. | |
| 2017/0349729 A1* | 12/2017 | Egawa | C08K 5/526 |
| 2018/0201782 A1* | 7/2018 | Egawa | G02B 1/045 |

FOREIGN PATENT DOCUMENTS

| | | |
|---|---|---|
| CN | 102030975 A | 4/2011 |
| CN | 105431488 A | 3/2016 |
| IN | 201947039333 A | 10/2019 |
| JP | 10-101944 A | 4/1998 |
| JP | 2002-060609 A | 2/2002 |
| JP | 2005-112963 A | 4/2005 |
| JP | 2011-080060 A | 4/2011 |
| JP | 2013-234233 A | 11/2013 |
| JP | 2015-526581 A | 9/2015 |
| JP | 5938419 B2 | 6/2016 |
| JP | 2016-166277 A | 9/2016 |
| JP | 6030814 B1 | 11/2016 |
| JP | 2017-105978 A | 6/2017 |
| JP | 2018-059038 A | 4/2018 |
| TW | 201323480 A | 6/2013 |
| TW | 201638210 A | 11/2016 |
| WO | WO-2007/132604 A1 | 11/2007 |
| WO | WO-2013/079599 A1 | 6/2013 |
| WO | WO-2016/125625 A1 | 8/2016 |
| WO | WO-2016/129018 A1 | 8/2016 |
| WO | WO-2017090310 A1 * | 6/2017 ............. C08L 69/00 |

OTHER PUBLICATIONS

International Search Report issued in International Application No. PCT/JP2018/013752 dated Jul. 3, 2018 (5 pages).

Extended European Search Report dated Aug. 18, 2020 for corresponding European Patent Application No. 18775371.0.

Office Action dated Dec. 5, 2018 for corresponding Taiwanese Patent Application No. 107111359.

Office Action dated Jun. 26, 2018 for corresponding Japanese Patent Application No. 2018-519500.

Office Action dated Mar. 30, 2021 for corresponding Indian Patent Application No. 201947039340.

Indian Patent Office, "Hearing Notice," issued in connection with Indian Patent Application No. 2019-47039340, dated Nov. 3, 2021, (3 pages).

Office Action dated Oct. 26, 2021 issued in a corresponding Indonesian Patent Application No. P00201908617, (5 pages).

Office Action dated Jun. 30, 2021 issued in a corresponding Chinese Patent Application No. 201880022551.4, (13 pages).

* cited by examiner

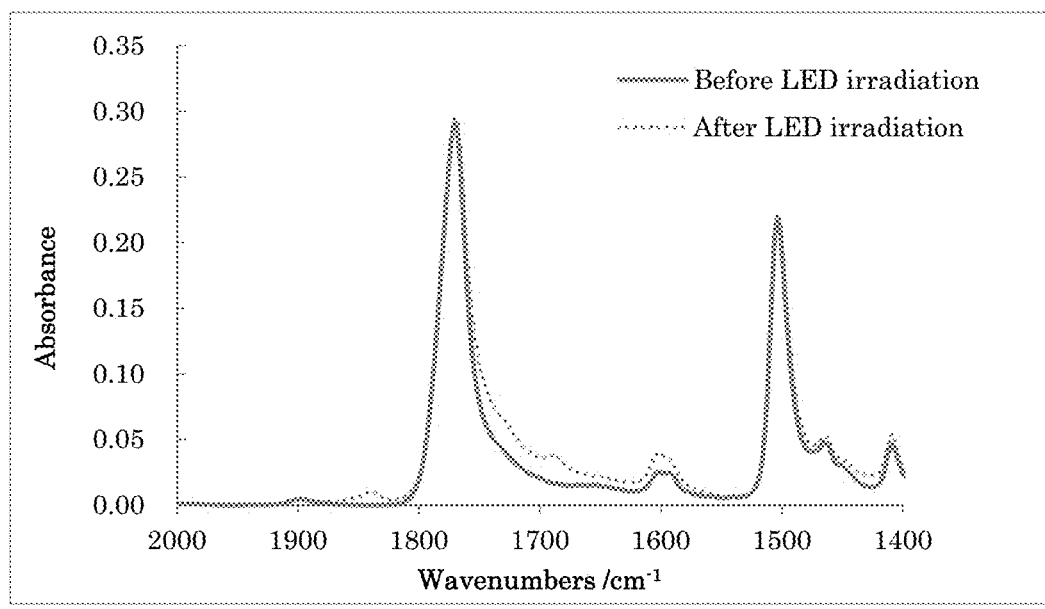

POLYCARBONATE RESIN COMPOSITION AND MOLDED BODY

CROSS-REFERENCE TO RELATED APPLICATIONS

The present application is a national phase of International Application No. PCT/JP2018/013752 filed Mar. 30, 2018, which claims priority to Japanese Patent Application No. 2017-066841 filed Mar. 30, 2017, the contents of which are all hereby incorporated by reference in their entireties.

TECHNICAL FIELD

The present invention relates to a polycarbonate resin composition and a molded body.

BACKGROUND ART

An aromatic polycarbonate resin is excellent in, for example, transparency, mechanical properties, thermal properties, and electrical properties, and has been used in various optical molded articles, such as a light-guiding member, for example, a light-guiding plate, a lens, and an optical fiber, through the utilization of its characteristics. In recent years, an investigation has been made on the use of a polycarbonate resin composition in light-guiding parts forming the light-guiding portions of the daytime running lights or daytime running lamps (hereinafter sometimes referred to as "DRLs") of vehicles and the like. The DRLs are each of a thick-walled structure, and hence are often molded at a temperature as low as 280° C. or less.

The polycarbonate resin composition to be used in a DRL for a vehicle is required to have the following features. The initial optical characteristic (color tone) of the composition after its molding is satisfactory. In addition, even when the composition is irradiated with light for a long time period, a change in color tone thereof does not occur, and hence the composition can maintain a satisfactory color tone under each of a high-temperature environment, and a high-temperature and high-humidity environment over a long time period. In PTL 1, as a polycarbonate resin composition intended to provide a molded article that has transparency comparable to that of an acrylic resin for optical applications, and that does not reduce impact resistance and heat resistance that are characteristic of an aromatic polycarbonate resin, there is a disclosure of a polycarbonate resin composition containing an aromatic polycarbonate resin and any predetermined other thermoplastic resin, and having predetermined optical characteristics. In PTL 1, there is a disclosure that a phosphorus-based antioxidant, and a functional group-containing silicone compound and/or an alicyclic epoxy compound may be incorporated into the resin composition for the purposes of improving its heat stability and hydrolysis resistance.

In PTL 2, as a polycarbonate-based resin composition that has imparted thereto excellent optical characteristics, that is excellent in, for example, high-temperature and high-humidity resistance, thermal aging resistance, heat resistance, and impact resistance, and that is suitable for the production of an optical part, such as an on-vehicle optical semiconductor device lens, there is a disclosure of a resin composition containing predetermined amounts of a polycarbonate-based resin, a specific arylphosphine, and an alicyclic epoxy compound.

In PTL 3, as a polycarbonate resin composition that is excellent in heat stability in molding at a high temperature exceeding 300° C., and that is intended to provide a molded article having a satisfactory light transmittance and a satisfactory luminance, and free from causing any discoloration or crack after its moist heat resistance test, there is a disclosure of a resin composition obtained by blending an aromatic polycarbonate resin with specific amounts of a specific diphosphite compound and an alicyclic epoxy compound.

In PTL 4, there is a disclosure of a polycarbonate resin composition containing a predetermined amount of each of a polycarbonate resin, phosphorus-based antioxidants, and a fatty acid ester, the phosphorus-based antioxidants being two kinds of compounds each having a specific structure, and the composition being capable of imparting excellent characteristics in accordance with the applications of a molded article.

CITATION LIST

Patent Literature

PTL 1: JP 2002-60609 A
PTL 2: JP 2005-112963 A
PTL 3: JP 5938419 B2
PTL 4: JP6030814 B1

SUMMARY OF INVENTION

Technical Problem

When a polycarbonate resin composition is used in a light-guiding part, such as a DRL for a vehicle, the following problem may occur: when the composition is irradiated with light for a long time period, the scorching thereof occurs owing to heat to reduce the color tone thereof.

However, the long-term durability of the resin composition disclosed in PTL 1 under each of a high-temperature environment, and a high-temperature and high-humidity environment has not been evaluated. In addition, the resin composition disclosed in PTL 1 contains an acrylic resin as an essential component.

A steam resistance test and a high-temperature aging resistance test have been performed on a molded body formed of the resin composition disclosed in PTL 2. However, a polycarbonate resin composition having heat resistance lasting for a longer time period is desired.

With regard to the resin compositions disclosed in PTLs 3 and 4, the YI value of a molded body obtained by molding each of the polycarbonate resin compositions after the composition has been retained under a high-temperature condition at the time of its molding has been evaluated. However, the long-term heat resistance of the molded body after the molding at a temperature near the glass transition point of the polycarbonate resin, the temperature exceeding 100° C., has not been evaluated.

A problem to be solved by the present invention is to provide a polycarbonate resin composition capable of producing a molded body that has a satisfactory initial color tone after molding at a temperature as low as 280° C. or less, and that is excellent in long-term moist heat resistance and long-term heat resistance.

Solution to Problem

The inventors of the present invention have found that the problem can be solved by a resin composition obtained by blending an aromatic polycarbonate resin with a specific amount of each of an alicyclic epoxy compound, a predetermined antioxidant, and a predetermined phosphorus compound.

That is, the present invention relates to the following polycarbonate resin composition and molded body.

<1> A polycarbonate resin composition, comprising:

an aromatic polycarbonate resin (A);

an alicyclic epoxy compound (B);

one or more kinds of antioxidants (C) selected from the group consisting of a compound (C1) represented by the following formula (1) and a compound (C2) represented by the following formula (2); and one or more kinds of phosphorus compounds (D) selected from the group consisting of a compound (D1) represented by the following formula (3) and an arylphosphine (D2) except the component (C2), wherein, with respect to 100 parts by mass of the component (A), a content of the component (B) is 0.01 part by mass or more and 0.1 part by mass or less, a content of the component (C) is 0.01 part by mass or more and 0.1 part by mass or less, and a content of the component (D) is 0.01 part by mass or more and 0.05 part by mass or less:

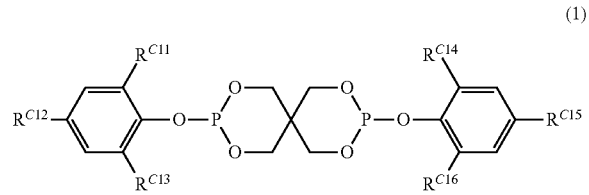

(1)

wherein in the formula (1), $R^{C11}$ to $R^{C16}$ each represent a hydrogen atom, or an aromatic ring-containing group having 6 or more and 15 or less carbon atoms, and may be identical to or different from each other, provided that not all of $R^{C11}$ to $R^{C16}$ represent hydrogen atoms;

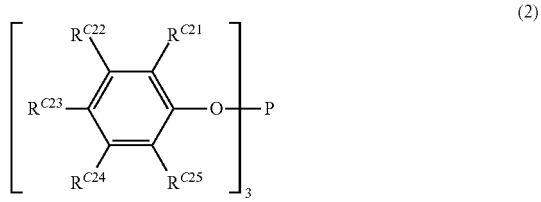

(2)

wherein in the formula (2), $R^{C21}$ to $R^{C25}$ each represent a hydrogen atom, an alkyl group having 1 or more and 12 or less carbon atoms, or an aryl group having 6 or more and 14 or less carbon atoms, and may be identical to or different from each other, provided that not all of $R^{C21}$ to $R^{C25}$ represent hydrogen atoms, and at least two of $R^{C21}$ to $R^{C25}$ each represent an alkyl group having 1 or more and 12 or less carbon atoms, or an aryl group having 6 or more and 14 or less carbon atoms;

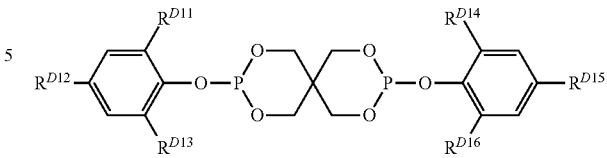

(3)

wherein in the formula (3), $R^{D11}$ to $R^{D16}$ each represent a hydrogen atom, or an alkyl group having 1 or more and 12 or less carbon atoms, and may be identical to or different from each other, provided that not all of $R^{D11}$ to $R^{D16}$ represent hydrogen atoms.

<2> The polycarbonate resin composition according to Item <1>, wherein a molded body (1) having a thickness of 5 mm, which is produced through use of the polycarbonate resin composition by an injection molding method at a cylinder temperature of 280° C. and a die temperature of 80° C. for a cycle time of 50 seconds, has an initial YI value $YI_1$, which is measured under conditions of a C light source and a two-degree field of view with a spectrophotometer, of less than 1.2.

<3> The polycarbonate resin composition according to Item <2>, wherein when a YI value after the molded body (1) has been stored under an environment at 85° C. and a humidity of 85% for 1,000 hours is represented by $YI_2$, $\Delta YI(YI_2-YI_1)$ is 1.0 or less, and when a YI value after the molded body (1) has been stored at 140° C. for 1,000 hours is represented by $YI_3$, $\Delta YI(YI_3-YI_1)$ is 3.0 or less.

<4> The polycarbonate resin composition according to any one of Items <1> to <3>, wherein the component (B) comprises 3',4'-epoxycyclohexylmethyl-3,4-epoxycyclohexane carboxylate.

<5> The polycarbonate resin composition according to any one of Items <1> to <4>, wherein the component (C) comprises bis(2,4-dicumylphenyl)pentaerythritol diphosphite.

<6> The polycarbonate resin composition according to any one of Items <1> to <5>, wherein the component (C2) comprises tris(2,4-di-tert-butylphenyl)phosphite.

<7> The polycarbonate resin composition according to any one of Items <1> to <6>, wherein the component (D1) comprises bis(2,6-di-tert-butyl-4-methylphenyl)pentaerythritol diphosphite.

<8> The polycarbonate resin composition according to any one of Items <1> to <7>, wherein the component (D2) comprises triphenylphosphine.

<9> The polycarbonate resin composition according to any one of Items <1> to <8>, wherein the component (C) comprises the component (C1), and the component (D) comprises the component (D1).

<10> The polycarbonate resin composition according to Item <9>, wherein the component (C1) comprises bis(2,4-dicumylphenyl)pentaerythritol diphosphite, and the component (D) comprises bis(2,6-di-tert-butyl-4-methylphenyl) pentaerythritol diphosphite.

<11> The polycarbonate resin composition according to any one of Items <1> to <10>, wherein a content ratio [(C)/(D)] of the component (C) to the component (D) is 0.2 or more and 10 or less in terms of mass ratio.

<12> The polycarbonate resin composition according to any one of Items <1> to <11>, further comprising a fatty acid ester (E).

<13> The polycarbonate resin composition according to any one of Items <1> to <12>, further comprising a UV absorber (F).

<14> A polycarbonate resin composition, comprising:
an aromatic polycarbonate resin (A);
an alicyclic epoxy compound (B);
one or more kinds of antioxidants (C) selected from the group consisting of
a compound (C1) represented by the following formula (1):

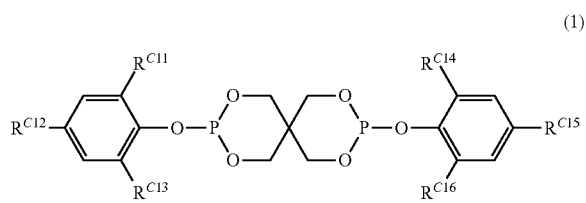

wherein
in the formula (1), $R^{C11}$ to $R^{C16}$ each represent a hydrogen atom, or an aromatic ring-containing group having 6 or more and 15 or less carbon atoms, and may be identical to or different from each other, provided that not all of $R^{C11}$ to $R^{C16}$ represent hydrogen atoms, and
a compound (C2) represented by the following formula (2):

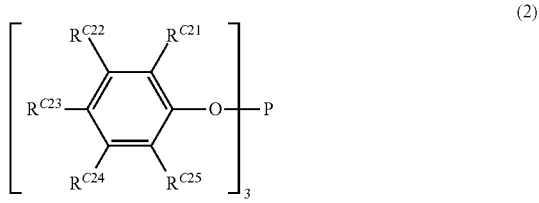

wherein
in the formula (2), $R^{C21}$ to $R^{C25}$ each represent a hydrogen atom, an alkyl group having 1 or more and 12 or less carbon atoms, or an aryl group having 6 or more and 14 or less carbon atoms, and may be identical to or different from each other, provided that not all of $R^{C21}$ to $R^{C25}$ represent hydrogen atoms, and at least two of $R^{C21}$ to $R^{C25}$ each represent an alkyl group having 1 or more and 12 or less carbon atoms, or an aryl group having 6 or more and 14 or less carbon atoms; and
one or more kinds of phosphorus compounds (D) selected from the group consisting of
a compound (D1) represented by the following formula (3):

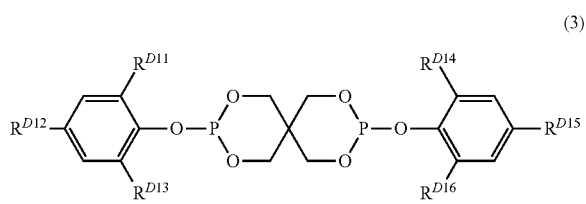

wherein
in the formula (3), $R^{D11}$ to $R^{D16}$ each represent a hydrogen atom, or an alkyl group having 1 or more and 12 or less carbon atoms, and may be identical to or different from each other, provided that not all of $R^{D11}$ to $R^{D16}$ represent hydrogen atoms, and
an arylphosphine (D2) except the component (C2),
wherein the polycarbonate resin composition has a peak intensity ratio in FT-IR measurement determined by the following method (1) of 13.0 or less:
Method (1):
A flat plate-shaped test piece measuring 50 mm by 90 mm by 5 mm thick is produced through use of the polycarbonate resin composition by an injection molding method at a cylinder temperature of 280° C. and a die temperature of 80° C. for a cycle time of 50 seconds; the test piece is irradiated with LED light for 500 hours under the following LED irradiation conditions in a thermostat at 100° C.; after the LED irradiation, a LED light-irradiated portion of a surface of the test piece is subjected to FT-IR measurement by an attenuated total reflection method; and a ratio of a peak intensity at a wavenumber of 1,686 cm$^{-1}$ to a peak intensity at a wavenumber of 1,776 cm$^{-1}$ when an absorbance at a wavenumber of 1,950 cm$^{-1}$ in a FT-IR measurement chart in which an axis of ordinate indicates an absorbance and an axis of abscissa indicates a wavenumber is defined as a baseline is determined.
(LED Irradiation Conditions)
LED power: 10 W
LED irradiation intensity: 850 lm
LED irradiation distance: 1 mm <15> A molded body, comprising the polycarbonate resin composition of any one of Items <1> to <14>.

<16> The molded body according to Item <15>, wherein the molded body comprises a light-guiding part.

<17> The molded body according to Item <16>, wherein the molded body comprises a light-guiding part for a vehicle.

Advantageous Effects of Invention

The molded body formed of the polycarbonate resin composition of the present invention has a satisfactory initial color tone after molding at a temperature as low as 280° C. or less, is excellent in long-term moist heat resistance, and has satisfactory long-term heat resistance at a temperature near the glass transition point of the polycarbonate resin. The molded body is suitable as a light-guiding part for a vehicle and various light-guiding plates.

BRIEF DESCRIPTION OF DRAWINGS

FIG. 1 is a reference graph for describing a peak intensity ratio in the FT-IR measurement of a polycarbonate resin composition determined by a method (1).

DESCRIPTION OF EMBODIMENTS

[Polycarbonate Resin Composition (I)]
A polycarbonate resin composition of the present invention includes: an aromatic polycarbonate resin (A); an alicyclic epoxy compound (B); one or more kinds of antioxidants (C) selected from the group consisting of a compound (C1) represented by the following formula (1) and a compound (C2) represented by the following formula (2); and one or more kinds of phosphorus compounds (D) selected from the group consisting of a compound (D1)

represented by the following formula (3) and an arylphosphine (D2) except the component (C2), wherein, with respect to 100 parts by mass of the component (A), the content of the component (B) is 0.01 part by mass or more and 0.1 part by mass or less, the content of the component (C) is 0.01 part by mass or more and 0.1 part by mass or less, and the content of the component (D) is 0.01 part by mass or more and 0.05 part by mass or less:

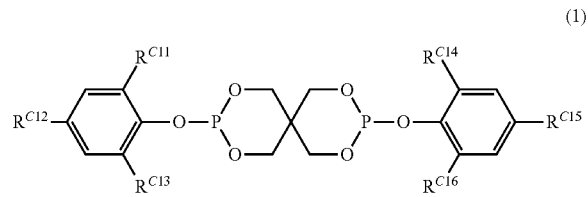

(1)

wherein in the formula (1), $R^{C11}$ to $R^{C16}$ each represent a hydrogen atom, or an aromatic ring-containing group having 6 or more and 15 or less carbon atoms, and may be identical to or different from each other, provided that not all of $R^{C11}$ to $R^{C16}$ represent hydrogen atoms;

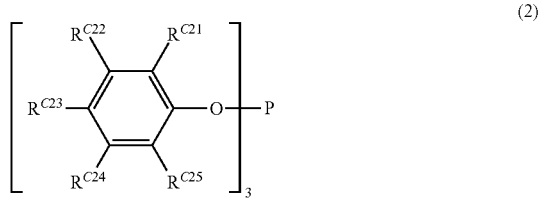

(2)

wherein in the formula (2), $R^{C21}$ to $R^{C25}$ each represent a hydrogen atom, an alkyl group having 1 or more and 12 or less carbon atoms, or an aryl group having 6 or more and 14 or less carbon atoms, and may be identical to or different from each other, provided that not all of $R^{C21}$ to $R^{C25}$ represent hydrogen atoms, and at least two of $R^{C21}$ to $R^{C25}$ each represent an alkyl group having 1 or more and 12 or less carbon atoms, or an aryl group having 6 or more and 14 or less carbon atoms;

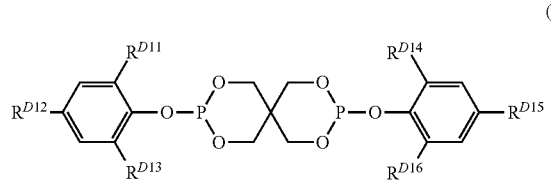

(3)

wherein in the formula (3), $R^{D11}$ to $R^{D16}$ each represent a hydrogen atom, or an alkyl group having 1 or more and 12 or less carbon atoms, and may be identical to or different from each other, provided that not all of $R^{D11}$ to $R^{D16}$ represent hydrogen atoms.

The polycarbonate resin composition of the present invention has the above-mentioned construction, and hence can produce a molded body that has a satisfactory initial color tone after molding at a temperature as low as 280° C. or less, that is excellent in long-term moist heat resistance, and that has satisfactory long-term heat resistance at a temperature near the glass transition point of the polycarbonate resin. Herein, a YI value is used in the evaluation of a color tone. A lower YI value means that the molded body has a better initial color tone and is hence more excellent in optical characteristics.

The resin composition may further include a fatty acid ester (E) or a UV absorber (F) to be described later.

However, the polycarbonate resin composition of the present invention is preferably free of a polyether compound because of the following reason. Examples of the polyether compound include compounds each having a polyoxyalkylene structure in a molecule thereof, such as a polyether polyol.

Daylight lamps that are attached to, for example, the outer peripheries of the head lamps or tail lamps of automobiles, and that are called daytime running lights or daytime running lamps (DRLs) are light-guiding rings each having a thick-walled lens structure. Any such DRL having a thick-walled structure is often molded at a temperature as low as 280° C. or less. The reason for the foregoing is as follows: unless a sufficient cooling time for the DRL having a thick-walled structure is secured, a product surface sinks or shrinks to cause strain, and hence a long molding cycle needs to be secured. When the molding cycle is long and a molding temperature is high, the time period for which a resin for the DRL remains in a molding machine lengthens, and as a result, a molten resin burns. Accordingly, the molding temperature needs to be reduced to the extent possible to prevent the retention burning of the resin.

In addition to the DRL having a thick-walled structure, a DRL having an elongated structure is present. The DRL having an elongated structure is similarly often molded at a temperature as low as 280° C. or less. In the case of a DRL part having an elongated structure, a die becomes larger, and hence there is often no choice but to mold the part in a large molding machine. In general, the large molding machine has a large cylinder diameter and a long cylinder length. The amount of a resin needed for the molding of the DRL part having an elongated structure is small for a molded article in the large molding machine. Accordingly, the time period for which the resin remains in the molding machine lengthens, and hence its thermal deterioration in the molding machine advances. Therefore, a molding temperature needs to be reduced to the extent possible to reduce an influence of the thermal deterioration in the molding machine.

In addition, such a heat resistance test under a severe environment as described below is performed on an on-vehicle light-guiding part, such as a DRL: heating is performed at a temperature near the melting point of a polycarbonate resin for about 1,000 hours. Such polyether polyols as described in, for example, JP 4069364 B2, WO 2011/083635 A1, and WO 2013/088796 A1 show significant effects in terms of an improvement in optical performance. Meanwhile, however, the polyether polyols each have low long-term heat resistance. Therefore, in such test under a severe environment as described above, it is difficult to suppress a reduction in optical performance of the polycarbonate resin composition merely by adding the polyether compound. Therefore, the composition is preferably free of the polyether compound.

The respective components to be used in the polycarbonate resin composition of the present invention are described below.

<Aromatic Polycarbonate Resin (A)>

The aromatic polycarbonate resin (A) (hereinafter sometimes referred to as "component (A)") to be incorporated into the polycarbonate resin composition of the present invention is not particularly limited, and a resin produced by a known method may be used.

For example, a resin produced by causing a dihydric phenol and a carbonate precursor to react with each other by a solution method (interfacial polycondensation method) or a melting method (ester exchange method), i.e., a resin produced by the interfacial polycondensation method involving causing the dihydric phenol and phosgene to react with each other in the presence of an end terminator, or by causing the dihydric phenol and diphenyl carbonate or the like to react with each other in the presence of the end terminator according to the ester exchange method or the like may be used as the aromatic polycarbonate resin (A).

Examples of the dihydric phenol may include various dihydric phenols, in particular: bis(hydroxyphenyl)alkane-based compounds, such as 2,2-bis(4-hydroxyphenyl)propane [bisphenol A], bis(4-hydroxyphenyl)methane, 1,1-bis(4-hydroxyphenyl)ethane, and 2,2-bis(4-hydroxy-3,5-dimethylphenyl)propane; 4,4'-dihydroxydiphenyl, a bis(4-hydroxyphenyl)cycloalkane, bis(4-hydroxyphenyl) oxide, bis(4-hydroxyphenyl) sulfide, bis(4-hydroxyphenyl) sulfone, bis(4-hydroxyphenyl) sulfoxide, and bis(4-hydroxyphenyl) ketone. In addition, examples thereof may also include hydroquinone, resorcin, and catechol. Those dihydric phenols may be used alone or in combination thereof.

Among them, one or more kinds of bis(hydroxyphenyl)alkane-based compounds selected from the group consisting of 2,2-bis(4-hydroxyphenyl)propane [bisphenol A], bis(4-hydroxyphenyl)methane, and 1,1-bis(4-hydroxyphenyl)ethane are preferred, and bisphenol A is particularly suitable.

Examples of the carbonate precursor include a carbonyl halide, a carbonyl ester, and a haloformate. The carbonate precursor is specifically phosgene, a dihaloformate of a dihydric phenol, diphenyl carbonate, dimethyl carbonate, diethyl carbonate, or the like.

The aromatic polycarbonate resin (A) may have a branched structure. As a branching agent used for introducing a branched structure, there are given, for example, 1,1,1-tris(4-hydroxyphenyl)ethane, α,α',α"-tris(4-hydroxyphenyl)-1,3,5-triisopropylbenzene, phloroglucin, trimellitic acid, and 1,3-bis(o-cresol).

A monovalent carboxylic acid or a derivative thereof or a monohydric phenol may be used as the end terminator. Examples thereof may include p-tert-butylphenol, p-phenylphenol, p-cumylphenol, p-perfluorononylphenol, p-(perfluorononylphenyl)phenol, p-(perfluorohexylphenyl)phenol, p-tert-perfluorobutylphenol, 1-(p-hydroxybenzyl)perfluorodecane, p-[2-(1H,1H-perfluorotridodecyloxy)-1,1,1,3,3,3-hexafluoropropyl]phenol, 3,5-bis(perfluorohexyloxycarbonyl)phenol, perfluorododecyl p-hydroxybenzoate, p-(1H,1H-perfluorooctyloxy)phenol, 2H,2H,9H-perfluorononanoic acid, and 1,1,1,3,3,3-hexafluoro-2-propanol.

It is preferred that the aromatic polycarbonate resin (A) be a polycarbonate resin including, in a main chain thereof, a repeating unit represented by the following formula (I):

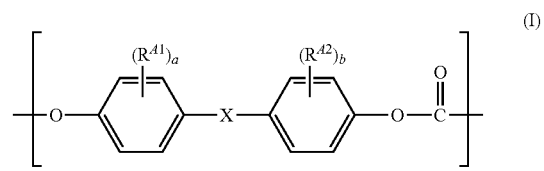

wherein $R^{41}$ and $R^{42}$ each independently represent an alkyl group or alkoxy group having 1 or more and 6 or less carbon atoms, and $R^{41}$ and $R^{42}$ may be identical to or different from each other, X represents a single bond, an alkylene group having 1 or more and 8 or less carbon atoms, an alkylidene group having 2 or more and 8 or less carbon atoms, a cycloalkylene group having 5 or more and 15 or less carbon atoms, a cycloalkylidene group having 5 or more and 15 or less carbon atoms, —S—, —SO—, —SO$_2$—, —O—, or —CO—, and "a" and "b" each independently represent an integer of 0 or more and 4 or less, when "a" represents 2 or more, $R^{41}$s may be identical to or different from each other, and when "b" represents 2 or more, $R^{42}$s may be identical to or different from each other.

Examples of the alkyl group represented by each of $R^{41}$ and $R^{42}$ include a methyl group, an ethyl group, a n-propyl group, an isopropyl group, various butyl groups (the term "various" means that a linear group and various branched groups are included, and the same holds true for the following), various pentyl groups, and various hexyl groups. An example of the alkoxy group represented by each of $R^{41}$ and $R^{42}$ is an alkoxy group whose alkyl group moiety is the alkyl group described above.

$R^{41}$ and $R^{42}$ each preferably represent an alkyl group having 1 or more and 4 or less carbon atoms or an alkoxy group having 1 or more and 4 or less carbon atoms.

Examples of the alkylene group represented by X include a methylene group, an ethylene group, a trimethylene group, a tetramethylene group, and a hexamethylene group. Among them, an alkylene group having 1 or more and 5 or less carbon atoms is preferred. Examples of the alkylidene group represented by X include an ethylidene group and an isopropylidene group. Examples of the cycloalkylene group represented by X include a cyclopentanediyl group, a cyclohexanediyl group, and a cyclooctanediyl group. Among them, a cycloalkylene group having 5 or more and 10 or less carbon atoms is preferred. Examples of the cycloalkylidene group represented by X include a cyclohexylidene group, a 3,5,5-trimethylcyclohexylidene group, and a 2-adamantylidene group. Among them, a cycloalkylidene group having 5 or more and 10 or less carbon atoms is preferred, and a cycloalkylidene group having 5 or more and 8 or less carbon atoms is more preferred.

"a" and "b" each independently represent an integer of 0 or more and 4 or less, preferably 0 or more and 2 or less, more preferably 0 or 1.

In the present invention, the aromatic polycarbonate resin (A) preferably contains a polycarbonate resin having a bisphenol A structure from the viewpoints of, for example, the transparency, mechanical characteristics, and thermal characteristics of a molded body to be obtained. The polycarbonate resin having a bisphenol A structure is specifically, for example, such a resin that X in the formula (I) represents an isopropylidene group. The content of the polycarbonate resin having a bisphenol A structure in the aromatic polycarbonate resin (A) is preferably 50 mass % or more and 100 mass % or less, more preferably 75 mass % or more and 100 mass % or less, still more preferably 85 mass % or more and 100 mass % or less.

In the present invention, the viscosity-average molecular weight (Mv) of the component (A) is preferably 10,000 or more and 30,000 or less, more preferably 11,000 or more and 25,000 or less from the viewpoint of the flowability of the polycarbonate resin composition of the present invention. In particular, when the polycarbonate resin composition of the present invention is used in a light-guiding part for a vehicle DRL, the Mv of the aromatic polycarbonate resin (A) is preferably 13,000 or more and 23,000 or less, more preferably 14,000 or more and 22,000 or less.

The viscosity-average molecular weight (Mv) as used herein is calculated from the following equation after the determination of a limiting viscosity [η] through the measurement of the viscosity of a methylene chloride solution at 20° C. with an Ubbelohde-type viscometer.

$$[\eta]=1.23\times10^{-5}Mv^{0.83}$$

The content of the component (A) in the polycarbonate resin composition of the present invention is preferably 50 mass % or more, more preferably 70 mass % or more, still more preferably 85 mass % or more, still further more preferably 95 mass % or more, still further more preferably 98 mass % or more from the viewpoint that the effects of the present invention are obtained. In addition, the upper limit of the content is preferably 99.9 mass % or less.

<Alicyclic Epoxy Compound (B)>

The polycarbonate resin composition of the present invention includes the alicyclic epoxy compound (B) (hereinafter sometimes referred to as "component (B)") for improving both the long-term moist heat resistance and long-term heat resistance of a molded body to be obtained. In the case where the polycarbonate resin composition of the present invention includes the alicyclic epoxy compound (B), even when the molded body obtained from the composition is subjected to long-term endurance tests under a high-temperature and high-humidity condition, and under a high-temperature condition, the molded body shows little yellowing, and hence can maintain a satisfactory color tone. Further, a molded body having the following feature is obtained: even when the molded body is irradiated with light from a LED or the like for a long time period in, for example, the application of a DRL for a vehicle, the molded body hardly deteriorates, and is hence excellent in LED irradiation resistance.

The alicyclic epoxy compound refers to a cyclic aliphatic compound having an alicyclic epoxy group, that is, an epoxy group obtained by adding one oxygen atom to an ethylene bond in an aliphatic ring, and specifically, compounds represented by the following formulae (B-1) to (B-10) are each suitably used:

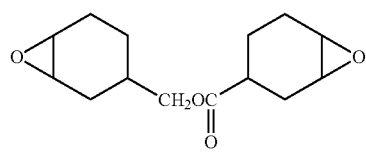
(B-1)

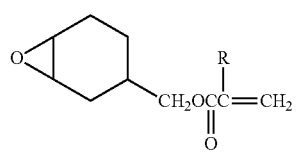
(B-2)

wherein R represents H or CH$_3$;

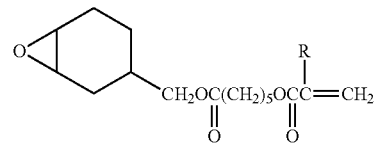
(B-3)

wherein R represents H or CH$_3$;

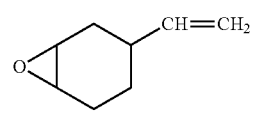
(B-4)

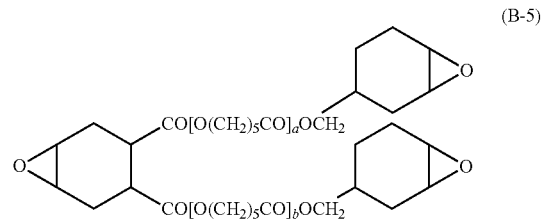
(B-5)

wherein "a"+"b" is equal to 1 or 2

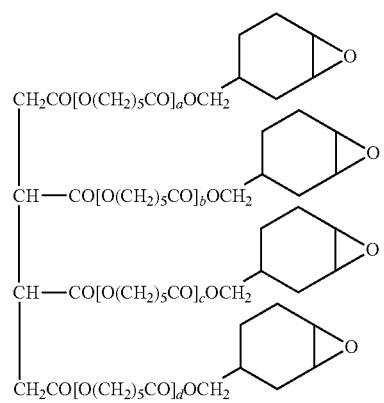
(B-6)

wherein "a"+"b"+"c"+"d" is equal to 1 or more and 3 or less;

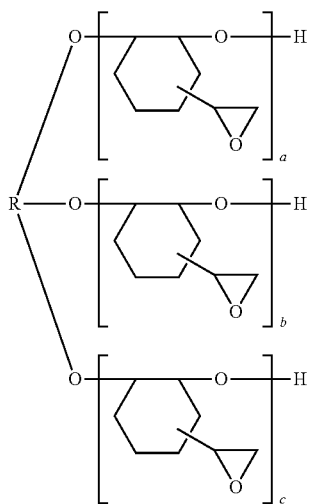

(B-7)

wherein "a"+"b"+"c" is equal to "n" (integer), and R represents a hydrocarbon group;

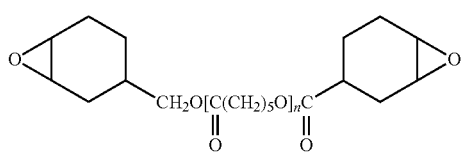

(B-8)

wherein "n" represents an integer;

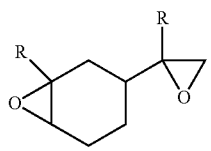

(B-9)

wherein R represents a hydrocarbon group;

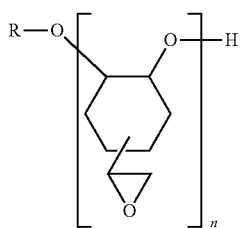

(B-10)

wherein "n" represents an integer and R represents a hydrocarbon group.

Among the above-mentioned alicyclic epoxy compounds, one or more kinds of compounds selected from the group consisting of the compounds represented by the formula (B-1), the formula (B-7), and the formula (B-10) are preferred because each of the compounds is excellent in compatibility with the aromatic polycarbonate resin (A), and hence does not impair the transparency of the polycarbonate resin composition; one or more kinds of compounds selected from the group consisting of the compounds represented by the formula (B-1) and the formula (B-10) are more preferred, and the compound represented by the formula (B-1) is still more preferred. For example, the compound represented by the formula (B-1) is available as 3',4'-epoxycyclohexylmethyl-3,4-epoxycyclohexane carboxylate ("CELLOXIDE 2021P" manufactured by Daicel Corporation). In addition, the compound represented by the formula (B-10) is available as a 1,2-epoxy-4-(2-oxiranyl)cyclohexane adduct of 2,2-bis(hydroxymethyl)-1-butanol ("EHPE 3150" manufactured by Daicel Corporation).

In addition, "EHPE 3150CE" commercially available as a mixture of CELLOXIDE 2021P and EHPE 3150 from Daicel Corporation may also be preferably used.

The content of the component (B) in the polycarbonate resin composition is 0.01 part by mass or more and 0.1 part by mass or less, preferably 0.02 part by mass or more and 0.1 part by mass or less, more preferably 0.02 part by mass or more and 0.05 part by mass or less with respect to 100 parts by mass of the component (A). When the content of the component (B) in the polycarbonate resin composition is less than 0.01 part by mass with respect to 100 parts by mass of the component (A), improving effects on the long-term moist heat resistance and long-term heat resistance of the molded body to be obtained are not sufficient. When the content is more than 0.1 part by mass, the improving effects on the long-term moist heat resistance and the long-term heat resistance are saturated.

<Antioxidants (C)>

The polycarbonate resin composition of the present invention includes one or more kinds of the antioxidants (C) (hereinafter sometimes referred to as "component (C)") selected from the group consisting of the compound (C1) represented by the following formula (1) (hereinafter sometimes referred to as "compound (C1)" or "component (C1)") and the compound (C2) represented by the following formula (2) (hereinafter sometimes referred to as "compound (C2)" or "component (C2)"):

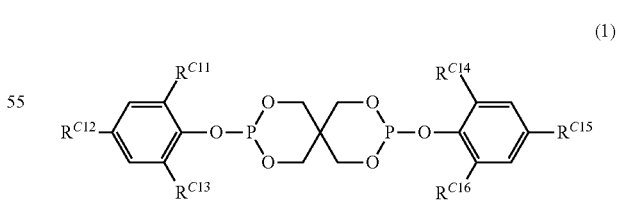

(1)

wherein in the formula (1), $R^{C11}$ to $R^{C16}$ each represent a hydrogen atom, or an aromatic ring-containing group having 6 or more and 15 or less carbon atoms, and may be identical to or different from each other, provided that not all of $R^{C11}$ to $R^{C16}$ represent hydrogen atoms;

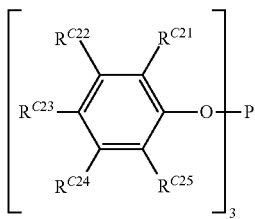

(2)

wherein in the formula (2), $R^{C21}$ to $R^{C25}$ each represent a hydrogen atom, an alkyl group having 1 or more and 12 or less carbon atoms, or an aryl group having 6 or more and 14 or less carbon atoms, and may be identical to or different from each other, provided that not all of $R^{C21}$ to $R^{C25}$ represent hydrogen atoms, and at least two of $R^{C21}$ to $R^{C25}$ each represent an alkyl group having 1 or more and 12 or less carbon atoms, or an aryl group having 6 or more and 14 or less carbon atoms.

When the polycarbonate resin composition of the present invention includes the predetermined component (C), in particular, the long-term moist heat resistance and long-term heat resistance of the molded body obtained from the composition become satisfactory. In addition, when the polycarbonate resin composition of the present invention includes all of the component (B), the component (C), and the predetermined phosphorus compounds (D) to be described later, the initial color tone of the molded body obtained from the composition after low-temperature molding, the long-term moist heat resistance thereof, and the long-term heat resistance thereof at a temperature near the glass transition point of the polycarbonate resin each become satisfactory. A polycarbonate resin composition free of any one of the components (B), (C), and (D) cannot provide a molded body whose initial color tone after low-temperature molding, long-term moist heat resistance, and long-term heat resistance are all satisfactory.

(Compound (C1))

The compound (C1) is a compound represented by the following formula (1):

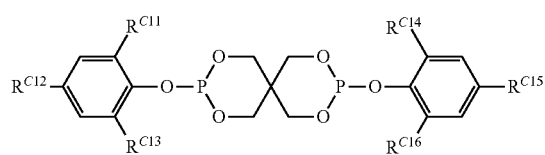

(1)

wherein in the formula (1), $R^{C11}$ to $R^{C16}$ each represent a hydrogen atom, or an aromatic ring-containing group having 6 or more and 15 or less carbon atoms, and may be identical to or different from each other, provided that not all of $R^{C11}$ to $R^{C16}$ represent hydrogen atoms. The aromatic ring-containing group has preferably 6 or more and 13 or less carbon atoms, more preferably 6 or more and 10 or less carbon atoms. Examples of the aromatic ring include a benzene ring, a naphthalene ring, a phenanthrene ring, and an anthracene ring. Among them, a benzene ring is preferred.

Examples of the aromatic ring-containing group having 6 to 15 carbon atoms include a phenyl group, a tolyl group, a xylyl group, a naphthyl group, a biphenyl group, a benzyl group, a phenethyl group, a phenylpropyl group, and a cumyl group. Those groups may each further have a substituent, such as a hydroxy group or an amino group.

Among them, a group represented by the following formula (1a) is preferred as the aromatic ring-containing group having 6 or more and 15 or less carbon atoms:

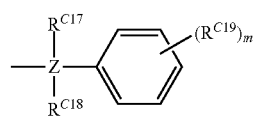

(1a)

wherein in the formula (1a), $R^{C17}$ and $R^{C18}$ each represent an alkyl group or an alkenyl group, and may be identical to or different from each other, or $R^{C17}$ and $R^{C18}$ may be bonded to each other to form a ring, and $R^{C17}$ and $R^{C18}$ each represent preferably an alkyl group having 1 or more and 5 or less carbon atoms, or an alkenyl group having 2 or more and 5 or less carbon atoms, more preferably an alkyl group having 1 or more and 3 or less carbon atoms, still more preferably a methyl group, in the formula (1a), $R^{19}$ represents a hydrogen atom or an alkyl group, preferably a hydrogen atom, or an alkyl group having 1 or more and 5 or less carbon atoms, more preferably a hydrogen atom, or an alkyl group having 1 or more and 3 or less carbon atoms, still more preferably a hydrogen atom, and "m" represents an integer of 0 or more and 5 or less, and when "m" represents 2 or more, a plurality of $R^{C19}$s may be identical to or different from each other, and in the formula (1a), Z represents a single bond or a carbon atom, and when Z represents a single bond, $R^{C17}$ and $R^{C18}$ are excluded from the formula (1a).

When the compound (C) has two or more groups each represented by the formula (1a), the plurality of groups may be identical to or different from each other.

From the viewpoint that the effects of the present invention are obtained, the compound (C) is preferably such that, in the formula (1), $R^{C11}$ and $R^{C14}$ each represent a hydrogen atom, and $R^{C12}$, $R^{C13}$, $R^{C15}$, and $R^{C16}$ each represent an aromatic ring-containing group having 6 or more and 15 or less carbon atoms, and is more preferably such that $R^{C11}$ and $R^{C14}$ each represent a hydrogen atom, and $R^{C12}$, $R^{C13}$, $R^{C15}$, and $R^{C16}$ each represent a group represented by the formula (1a).

That is, the component (C1) to be used in the present invention is preferably a pentaerythritol diphosphite compound represented by the following formula (C1-1):

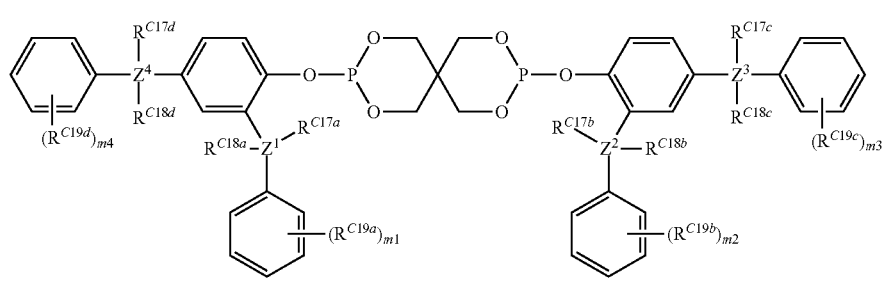

(C1-1)

wherein $R^{C17a}$ to $R^{C17d}$ and $R^{C18a}$ to $R^{C18d}$ each represent an alkyl group or an alkenyl group, and may be identical to or different from each other, or $R^{C17a}$ and $R^{C18a}$, $R^{C17b}$ and $R^{C18}$, $R^{C17c}$ and $R^{C18c}$, or $R^{C17d}$ and $R^{C18d}$ may be bonded to each other to form a ring, $R^{C19a}$ to $R^{C19d}$ each represent a hydrogen atom or an alkyl group, and may be identical to or different from each other, m1 to m4 each represent an integer of 0 or more and 5 or less, and may be identical to or different from each other, and when any one of m1 to m4 represents 2 or more, a plurality of $R^{C19a}$s, $R^{C19b}$s, $R^{C9c}$s, or $R^{C19d}$s may be identical to or different from each other, and $Z^1$ to $Z^4$ each represent a single bond or a carbon atom, and may be identical to or different from each other, and when any one of $Z^1$ to $Z^4$ represents a single bond, the corresponding two of $R^{C17a}$ to $R^{C17d}$ and $R^{C18a}$ to $R^{C18d}$ are excluded from the formula (C1-1).

In the formula (C1-1), $R^{C17a}$ to $R^{C17d}$ and $R^{C18a}$ to $R^{C18d}$ each represent preferably an alkyl group having 1 or more and 5 or less carbon atoms, or an alkenyl group having 2 or more and 5 or less carbon atoms, more preferably an alkyl group having 1 or more and 3 or less carbon atoms, still more preferably a methyl group. It is still further more preferred that all of $R^{C17a}$ to $R^{C17d}$ and $R^{C18a}$ to $R^{C18d}$ represent methyl groups.

$R^{C19a}$ to $R^{C19d}$ each represent preferably a hydrogen atom, or an alkyl group having 1 or more and 5 or less carbon atoms, more preferably a hydrogen atom, or an alkyl group having 1 or more and 3 or less carbon atoms, still more preferably a hydrogen atom. It is still further more preferred that all of $R^{C19a}$ to $R^{C19d}$ represent hydrogen atoms.

m1 to m4 each represent preferably 0 or more and 3 or less, more preferably 0 or more and 1 or less, still more preferably 0. $Z^1$ to $Z^4$ each preferably represent a carbon atom.

Among the pentaerythritol diphosphite compounds each represented by the formula (C1-1), bis(2,4-dicumylphenyl) pentaerythritol diphosphite represented by the following formula (C1-2) is particularly suitable because the compound can impart long-term moist heat resistance and long-term heat resistance to the polycarbonate resin composition, and is easily available. The compound is available as a commercial product, and for example, "Doverphos S-9228PC" manufactured by Dover Chemical Corporation may be used.

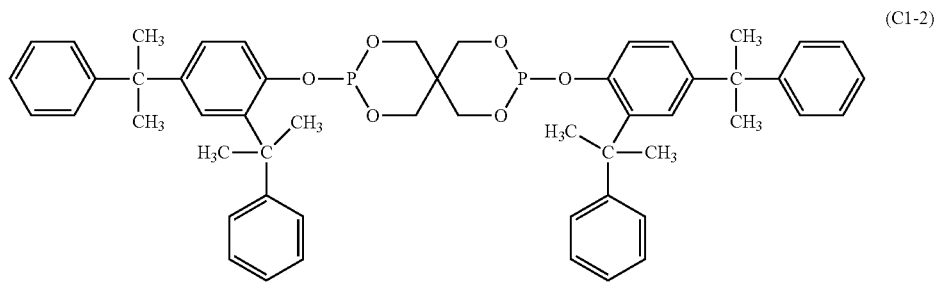

(C1-2)

(Compound (C2))

The compound (C2) is a compound represented by the following formula (2):

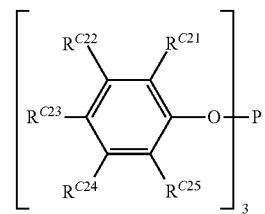

(2)

wherein in the formula (2), $R^{C21}$ to $R^{C25}$ each represent a hydrogen atom, an alkyl group having 1 or more and 12 or less carbon atoms, or an aryl group having 6 or more and 14 or less carbon atoms, and may be identical to or different from each other, provided that not all of $R^{C21}$ to $R^{C25}$ represent hydrogen atoms from the viewpoint of the effect of the antioxidant, and at least two of $R^{C21}$ to $R^{C25}$ each represent an alkyl group having 1 or more and 12 or less carbon atoms, or an aryl group having 6 or more and 14 or less carbon atoms. The compound is preferably a compound in which any two of $R^{C21}$ to $R^{C25}$ each represent an alkyl group having 1 or more and 12 or less carbon atoms, or an aryl group having 6 or more and 14 or less carbon atoms, and the others each represent a hydrogen atom, more preferably a compound in which at least one of $R^{C21}$ or $R^{C25}$ represents an alkyl group having 1 to 12 carbon atoms, or an aryl group having 6 or more and 14 or less carbon atoms among the compounds in each of which any two of $R^{C21}$ to $R^{C25}$ each represent an alkyl group having 1 or more and 12 or less carbon atoms, or an aryl group having 6 or more and 14 or less carbon atoms, and the others each represent a hydrogen atom.

Examples of the alkyl group having 1 or more and 12 or less carbon atoms include a methyl group, an ethyl group, a n-propyl group, an isopropyl group, various butyl groups, various pentyl groups, various hexyl groups, various octyl groups, various decyl groups, and various dodecyl groups. Among them, one or more kinds selected from the group consisting of a methyl group, an ethyl group, a n-propyl group, an isopropyl group, various butyl groups, various pentyl groups, various hexyl groups, and various octyl groups are preferred, one or more kinds selected from the group consisting of a methyl group, an ethyl group, an isopropyl group, and a tert-butyl group are more preferred, and a tert-butyl group is still more preferred from the viewpoint of imparting long-term moist heat resistance and long-term heat resistance.

Examples of the aryl group having 6 or more and 14 or less carbon atoms include a phenyl group, a tolyl group, and a xylyl group.

$R^{C21}$ to $R^{C25}$ each represent more preferably a hydrogen atom, or an alkyl group having 1 or more and 12 or less carbon atoms among them from the viewpoint that the thermal decomposition of the compound hardly occurs, and the improving effects on the long-term moist heat resistance and the long-term heat resistance are excellent; $R^{C21}$ to $R^{C25}$ each represent still more preferably a hydrogen atom, a methyl group, an ethyl group, an isopropyl group, or a tert-butyl group, still further more preferably a hydrogen atom or a tert-butyl group.

The compound (C2) is particularly preferably such a compound that, in the formula (2), $R^{C21}$ and $R^{C23}$ each represent a tert-butyl group, and $R^{C22}$, $R^{C24}$, and $R^{C25}$ each represent a hydrogen atom (tris(2,4-di-tert-butylphenyl) phosphite).

The components (C) may be used alone or in combination thereof. For example, the compound (C1) and the compound (C2) may be used in combination.

The antioxidants (C) to be used in the present invention are preferably one or more kinds selected from the group consisting of bis(2,4-dicumylphenyl)pentaerythritol diphosphite and tris(2,4-di-tert-butylphenyl)phosphite. In addition, among the compounds (C1) and (C2), the compound (C) is preferred, the pentaerythritol diphosphite compound represented by the formula (C1-1) is more preferred, and bis(2,4-dicumylphenyl)pentaerythritol diphosphite represented by the formula (C1-2) is still more preferred.

The content of the component (C) in the polycarbonate resin composition is 0.01 part by mass or more and 0.1 part by mass or less, preferably 0.02 part by mass or more and 0.1 part by mass or less, more preferably 0.02 part by mass or more and 0.06 part by mass or less, still more preferably 0.02 part by mass or more and 0.05 part by mass or less with respect to 100 parts by mass of the component (A). When the content of the component (C) is less than 0.01 part by mass with respect to 100 parts by mass of the component (A), improving effects on the long-term moist heat resistance and the long-term heat resistance are not sufficient. In addition, when the content is more than 0.1 part by mass, the initial YI value of the molded body tends to increase.

<Phosphorus Compounds (D)>

The polycarbonate resin composition of the present invention includes one or more kinds of the phosphorus compounds (D) (hereinafter sometimes referred to as "component (D)") selected from the group consisting of the compound (D1) represented by the following formula (3) (hereinafter sometimes referred to as "compound (D1)" or "component (D1)") and the arylphosphine (D2) except the component (C2) (hereinafter sometimes referred to as "compound (D2)" or "component (D2)"):

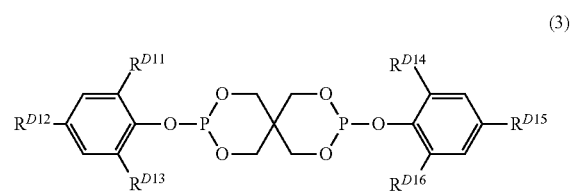

(3)

wherein
in the formula (3), $R^{D11}$ to $R^{D16}$ each represent a hydrogen atom, or an alkyl group having 1 or more and 12 or less carbon atoms, and may be identical to or different from each other, provided that not all of $R^{D11}$ to $R^{D16}$ represent hydrogen atoms.

When the polycarbonate resin composition of the present invention includes the predetermined component (D), the initial color tone of the molded body obtained from the composition becomes satisfactory. In particular, when the component (C) and the component (D) are used in combination, effects on the initial color tone, long-term moist heat resistance, and long-term heat resistance in the molded body obtained from the polycarbonate resin composition of the present invention complement each other, and hence a molded body satisfying all of these characteristics can be obtained.

(Compound (D1))

The compound (D) is a compound represented by the following formula (3):

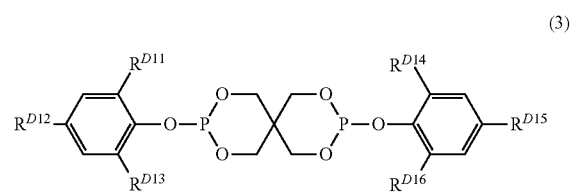

(3)

wherein
in the formula (3), $R^{D11}$ to $R^{D16}$ each represent a hydrogen atom, or an alkyl group having 1 or more and 12 or less carbon atoms, and may be identical to or different from each other, provided that not all of $R^{D11}$ to $R^{D16}$ represent hydrogen atoms.

Examples of the alkyl group having 1 or more and 12 or less carbon atoms include a methyl group, an ethyl group, a n-propyl group, an isopropyl group, various butyl groups, various pentyl groups, various hexyl groups, various hexyl groups, various octyl groups, various nonyl groups, various decyl groups, various undecyl groups, and various dodecyl groups.

In the formula (3), $R^{D11}$ to $R^{D16}$ each preferably represent an alkyl group having 1 or more and 12 or less carbon atoms from the viewpoint that the effects of the present invention are obtained. $R^{D11}$ to $R^{D16}$ each represent more preferably one or more kinds selected from the group consisting of a methyl group, an ethyl group, a n-propyl group, an isopropyl group, various butyl groups, various pentyl groups, various hexyl groups, and various octyl groups, still more preferably one or more kinds selected from the group consisting of a methyl group, an ethyl group, an isopropyl group, and a tert-butyl group.

Among them, such a compound that $R^{D11}$, $R^{D13}$, $R^{D14}$, and $R^{D16}$ each represent a tert-butyl group and $R^{D12}$ and $R^{D15}$ each represent a methyl group is more preferred as the compound (D). That is, the component (D) to be used in the present invention is preferably bis(2,6-di-tert-butyl-4-methylphenyl)pentaerythritol diphosphite.

(Compound (D2))

The compound (D2) is an arylphosphine except the component (C2). The arylphosphine only needs to be a phosphine compound having one or more aryl groups, and is, for example, a compound represented by the following formula (4):

$$P\text{—}(R^{D21})_3 \quad (4)$$

wherein in the formula (4), $R^{D21}$s each represent a hydrocarbon group that may have a substituent, and at least one of $R^{D21}$s represents an aryl group having 6 or more and 18 or less carbon atoms, and the plurality of $R^{D21}$s may be identical to or different from each other.

Examples of the compound represented by the formula (4) include triphenylphosphine, diphenylbutylphosphine, diphenyloctadecylphosphine, tris(p-tolyl)phosphine, tris(p-nonylphenyl)phosphine, tris(naphthyl)phosphine, diphenyl(hydroxymethyl)phosphine, diphenyl(acetoxymethyl)phosphine, diphenyl(ß-ethylcarboxyethyl)phosphine, tris(p-chlorophenyl)phosphine, tris(p-fluorophenyl)phosphine, diphenylbenzylphosphine, diphenyl-ß-cyanoethylphosphine, diphenyl(p-hydroxyphenyl)phosphine, diphenyl-1,4-dihydroxyphenyl-2-phosphine, and phenylnaphthylbenzylphosphine. Those compounds may be used alone or in combination thereof.

Among them, such a compound that $R^{D21}$s in the formula (4) each represent an aryl group is preferred as the component (D2) from the viewpoint that the effects of the present invention are obtained and the viewpoint of the heat resistance of the molded body, and triphenylphosphine is more preferred.

The components (D) may be used alone or in combination thereof. As the component (D), the compound (D1) and the compound (D2) may be used in combination.

The phosphorus compounds (D) to be used in the present invention are preferably one or more kinds selected from the group consisting of bis(2,6-di-tert-butyl-4-methylphenyl) pentaerythritol diphosphite and triphenylphosphine. In addition, among the compounds (D) and (D2), the compound (D1) is more preferred, and among the compounds (D1), bis(2,6-di-tert-butyl-4-methylphenyl)pentaerythritol diphosphite is still more preferred.

The content of the component (D) in the polycarbonate resin composition is 0.01 part by mass or more and 0.05 part by mass or less, preferably 0.01 part by mass or more and 0.04 part by mass or less, more preferably 0.01 part by mass or more and 0.03 part by mass or less with respect to 100 parts by mass of the component (A). When the content of the component (C) is less than 0.01 part by mass with respect to 100 parts by mass of the component (A), the effect of the addition of the component (D) is not sufficient. In addition, when the content is more than 0.05 part by mass, the long-term moist heat resistance and the long-term heat resistance tend to reduce.

In the polycarbonate resin composition of the present invention, from the viewpoint that a molded body whose initial color tone after low-temperature molding, long-term moist heat resistance, and long-term heat resistance are all satisfactory is obtained, it is preferred that the component (C) be the component (C1), and the component (D) be the component (D1), and it is more preferred that the component (C) be bis(2,4-dicumylphenyl)pentaerythritol diphosphite, and the component (D1) be bis(2,6-di-tert-butyl-4-methylphenyl)pentaerythritol diphosphite.

Further, in the polycarbonate resin composition of the present invention, the total content of the component (C) and the component (D) is preferably 0.05 part by mass or less, more preferably 0.04 part by mass or less, still more preferably 0.035 part by mass or less, still further more preferably 0.03 part by mass or less with respect to 100 parts by mass of the component (A). When the total content of the component (C) and the component (D) is 0.05 part by mass or less, in particular, a molded body having the following feature is obtained: even when the molded body is irradiated with light from a LED or the like for a long time period, the molded body hardly deteriorates, and is hence excellent in LED irradiation resistance. In addition, further, when the total content of the component (C) and the component (D) is 0.02 part by mass or more, both of excellent performance in terms of initial color tone after low-temperature molding, long-term moist heat resistance, and long-term heat resistance, and the LED irradiation resistance can be achieved, and hence the polycarbonate resin composition and the molded body are particularly useful in, for example, the application of a DRL for a vehicle.

In addition, from the viewpoint that a molded body whose initial color tone after low-temperature molding, long-term moist heat resistance, and long-term heat resistance are all satisfactory is obtained, the content ratio [(C)/(D)] of the component (C) to the component (D) in the polycarbonate resin composition is preferably 0.2 or more and 10 or less, more preferably 0.4 or more and 9.0 or less, still more preferably 0.5 or more and 5.0 or less, still further more preferably 0.8 or more and 4.0 or less, still further more preferably 0.8 or more and 2.5 or less in terms of mass ratio.

<Fatty Acid Ester (E)>

The polycarbonate resin composition of the present invention may further include a fatty acid ester (E) (hereinafter sometimes referred to as "component (E)"). The fatty acid ester (E) is a condensate of an aliphatic carboxylic acid and an alcohol.

Examples of the aliphatic carboxylic acid include saturated or unsaturated aliphatic monocarboxylic acids, aliphatic dicarboxylic acids, aliphatic tricarboxylic acids, and aliphatic tetracarboxylic acids. Among them, one or more kinds selected from the group consisting of aliphatic monocarboxylic acids and aliphatic dicarboxylic acids are preferred, and aliphatic monocarboxylic acids are more preferred. The aliphatic carboxylic acid may be a chain aliphatic carboxylic acid or a cyclic aliphatic carboxylic acid, but is preferably a chain aliphatic carboxylic acid. The aliphatic carboxylic acid has preferably 6 or more and 40 or less carbon atoms, more preferably 8 or more and 32 or less carbon atoms, still more preferably 12 or more and 24 or less carbon atoms.

Examples of the saturated aliphatic carboxylic acids include: saturated aliphatic monocarboxylic acids, such as capric acid, neodecanoic acid, lauric acid, myristic acid, palmitic acid, stearic acid, arachidic acid, behenic acid, and lignoceric acid; and saturated aliphatic dicarboxylic acids, such as adipic acid, azelaic acid, and sebacic acid. Examples of the unsaturated aliphatic carboxylic acids include undecylenic acid, oleic acid, elaidic acid, erucic acid, nervonic acid, linoleic acid, ricinoleic acid, γ-linolenic acid, arachidonic acid, α-linolenic acid, stearidonic acid, eicosapentaenoic acid, and docosahexaenoic acid.

Among them, as the aliphatic carboxylic acid, one or more kinds selected from the group consisting of lauric acid, myristic acid, palmitic acid, stearic acid, and behenic acid are preferred, one or more kinds selected from the group consisting of palmitic acid, stearic acid, and behenic acid are more preferred, and stearic acid is still more preferred.

As the alcohol, an aliphatic alcohol is preferred, and a saturated aliphatic alcohol is more preferred. The saturated aliphatic alcohol may be a saturated chain aliphatic alcohol or a saturated cyclic aliphatic alcohol, but is preferably a saturated chain aliphatic alcohol. Those alcohols may each be a monohydric alcohol or a polyhydric alcohol. In addition, the alcohol may have a substituent, such as a fluorine atom, a chlorine atom, a bromine atom, or an aryl group.

The alcohol has preferably 1 or more and 30 or less carbon atoms, more preferably 2 or more and 24 or less carbon atoms.

Specific examples of the alcohol include octanol, decanol, dodecanol, tetradecanol, stearyl alcohol, behenyl alcohol, ethylene glycol, diethylene glycol, glycerin, pentaerythritol, 2,2-dihydroxyperfluoropropanol, neopentylene glycol, ditrimethylolpropane, and dipentaerythritol.

Examples of the fatty acid ester (E) include behenyl behenate, octyldodecyl behenate, stearyl stearate, glycerin monopalmitate, glycerin monostearate, glycerin monooleate, glycerin distearate, glycerin tristearate, pentaerythritol monopalmitate, pentaerythritol monostearate, pentaerythritol distearate, pentaerythritol tristearate, and pentaerythritol tetrastearate. Those fatty acid esters may be used alone or in combination thereof.

Among them, as the fatty acid ester (E), stearates are preferred, and glycerin monostearate is more preferred.

When the component (E) is used, the content of the component (E) in the polycarbonate resin composition is preferably 0.01 part by mass or more and 0.2 part by mass or less, more preferably 0.02 part by mass or more and 0.1 part by mass or less with respect to 100 parts by mass of the component (A). When the content of the component (E) is 0.01 part by mass or more with respect to 100 parts by mass of the component (A), a releasability-improving effect is satisfactory, and when the content is 0.2 part by mass or less, the long-term heat resistance is satisfactory.

<UV Absorber (F)>

The polycarbonate resin composition of the present invention may further include a UV absorber (F) (hereinafter sometimes referred to as "component (F)") for improving its weatherability.

Examples of the UV absorber include a benzoxazinone-based compound, a benzotriazole-based compound, a salicylate-based compound, a malonic acid ester-based compound, an oxalylaramid-based compound, a triazine-based compound, a benzophenone-based compound, and a cyanoacrylate-based compound. Those UV absorbers may be used alone or in combination thereof.

An example of the benzoxazinone-based compound may be a compound represented by the following formula (5):

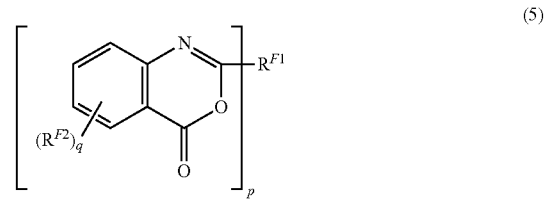

(5)

wherein
in the formula (5), $R^{F1}$ represents a residue obtained by removing p hydrogen atoms from an aromatic compound having one or two aromatic rings in a molecule thereof, $R^{F2}$ represents a hydrogen atom, a halogen atom, a nitro group, an alkyl group having 1 or more and 8 or less carbon atoms, an alkoxyl group having 1 or more and 8 or less carbon atoms, or an alkenyloxy group having 2 or more and 8 or less carbon atoms, "p" represents 2 or 3, and "q" represents an integer of 1 or more and 4 or less.

In the formula (5), examples of $R^{F1}$ include a phenylene group, a biphenylene group, and a naphthylene group, and a phenylene group is preferred.

As $R^{F2}$, examples of the alkyl group having 1 or more and 8 or less carbon atoms may include alkyl groups, such as a methyl group, an ethyl group, a propyl group, and a butyl group. Examples of the alkoxyl group having 1 or more and 8 or less carbon atoms may include a methoxy group, an ethoxy group, a propoxy group, and a butoxy group. Examples of the alkenyloxy group having 2 or more and 8 or less carbon atoms may include an allyloxy group, a 2-propenyloxy group, a 2-butenyloxy group, and a 2-methyl-3-propenyloxy group.

Among the compounds each represented by the formula (5), 2,2'-(1,4-phenylene)bis[4H-3,1-benzoxazin-4-one] represented by the following formula is preferred.

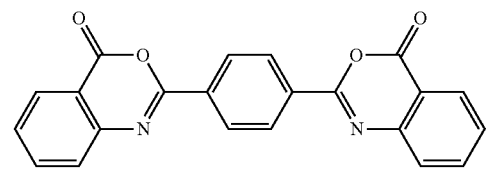 [SMILES: O=c1oc(-c2ccc(-c3nc4ccccc4c(=O)o3)cc2)nc2ccccc12]

Examples of the benzotriazole-based compound include
2-(2'-hydroxy-5'-methylphenyl)benzotriazole,
2-(2'-hydroxy-5'-butylphenyl)benzotriazole,
2-(2'-hydroxy-5'-t-octylphenyl)benzotriazole,
2-(2'-hydroxy-3',5'-di-1-butylphenyl)benzotriazole,
2-(2'-hydroxy-3',5'-di-amylphenyl)benzotriazole,
2-(2'-hydroxy-3'-dodecyl-5'-methylphenyl)benzotriazole,
2-(2'-hydroxy-3',5'-dicumylphenyl)benzotriazole, and
2,2'-methylenebis[4-(1,1,3,3-tetramethylbutyl)-6-(2H-benzotriazol-2-yl)phenol].

Examples of the salicylate-based compound include phenyl salicylate, p-t-butylphenyl salicylate, and p-octylphenyl salicylate. Examples of the malonic acid ester-based compound include benzylidene bis(diethyl malonate) and 4-methoxyphenyl-methylene-dimethyl ester. An example of the oxalylaramid-based compound is an oxalylaramid compound with a hydrocarbon group having 1 or more and 12 or less carbon atoms.

The above-mentioned compounds may be used alone or in combination thereof.

Among them, as the UV absorber (F), the benzoxazinone-based compound is preferred, and 2,2'-(1,4-phenylene)bis[4H-3,1-benzoxazin-4-one] represented by the above-mentioned formula is more preferred.

When the component (F) is used, the content of the component (F) in the polycarbonate resin composition is preferably 0.01 part by mass or more and 0.3 part by mass or less, more preferably 0.05 part by mass or more and 0.1 part by mass or less with respect to 100 parts by mass of the component (A) from the viewpoints of an improvement in weatherability and economical efficiency.

<Other Additive>

An arbitrary additive, such as polyorganosiloxane, may be appropriately added to the polycarbonate resin composition of the present invention in addition to the above-mentioned components.

The polyorganosiloxane is preferably a compound having one or more kinds of functional groups, such as an alkoxy group, an aryloxy group, a polyoxyalkylene group, a carboxyl group, a silanol group, an amino group, a mercapto group, an epoxy group, and a vinyl group.

The kinematic viscosity of the polyorganosiloxane at 25° C. is preferably 10 $mm^2$/s or more from the viewpoint of a lubricating effect serving as the releasability, and is preferably 200 $mm^2$/s or less from the viewpoint of its dispersibility in the polycarbonate resin. From the viewpoints, the viscosity of the polyorganosiloxane falls within the range of more preferably 20 $mm^2$/s or more and 150 $mm^2$/s or less, still more preferably 40 $mm^2$/s or more and 120 $mm^2$/s or less.

A difference between the refractive index of the polyorganosiloxane and the refractive index of the polycarbonate is preferably made as small as possible in order that the transparency of the polycarbonate may not be reduced at the addition of the polyorganosiloxane thereto. The refractive index of the polyorganosiloxane is preferably 1.45 or more, more preferably 1.50 or more because the refractive index of the polycarbonate is 1.58.

The addition amount of the polyorganosiloxane is preferably 0.01 part by mass or more and 0.15 part by mass or less, more preferably 0.02 part by mass or more and 0.15 part by mass or less, still more preferably 0.05 part by mass or more and 0.1 part by mass or less with respect to 100 parts by mass of the aromatic polycarbonate resin (A). When the addition amount falls within the range, the releasability can be improved. Further, even under a continuous molding condition, the amount of a mold deposit can be significantly reduced.

<Method of Producing Polycarbonate Resin Composition>

A method of producing the polycarbonate resin composition of the present invention is not particularly limited. The polycarbonate resin composition may be produced, for example, by mixing the components (A) to (D), and as required, the components (E) and (F) and any other additive, and melting and kneading the mixture. The melting and kneading may be performed by a typically used method, for example, a method using a single-screw extruder, a double-screw extruder, a co-kneader, a multiple-screw extruder, or the like. In normal cases, a heating temperature at the time of the melting and kneading is appropriately selected from the range of from 220° C. to 300° C.

<Various Characteristics of Polycarbonate Resin Composition>

The polycarbonate resin composition of the present invention is preferably such that a molded body (1) having a thickness of 5 mm, which is produced through the use of the polycarbonate resin composition by an injection molding method at a cylinder temperature of 280° C. and a die temperature of 80° C. for a cycle time of 50 seconds, has an initial YI value $YI_1$, which is measured under the conditions of a C light source and a two-degree field of view with a spectrophotometer, of less than 1.2. When the $YI_1$ is less than 1.2, the molded body has a satisfactory initial color tone, and is hence suitable for, for example, a light-guiding part for a vehicle. A color tone to be visually observed differs from each other between the case where the $YI_1$ of the molded body (1) is 1.1 or less and the case where the $YI_1$ is 1.2 or more. When the $YI_1$ is 1.2 or more, a yellow tinge is conspicuous, but when the $YI_1$ is 1.1 or less, substantially no coloring is visually observed, and hence the initial color tone is judged to be satisfactory.

In terms of the initial color tone of the molded body to be obtained, the $YI_1$ is preferably 1.15 or less, more preferably 1.1 or less, still more preferably 1.0 or less.

In addition, the polycarbonate resin composition of the present invention is more preferably such that when a YI value after the molded body (1) has been stored under an environment at 85° C. and a humidity of 85% for 1,000 hours is represented by $YI_2$, $\Delta YI(YI_2-YI_1)$ is 1.0 or less, and when a YI value after the molded body (1) has been stored at 140° C. for 1,000 hours is represented by $YI_3$, $\Delta YI(YI_3-YI_1)$ is 3.0 or less. When the $\Delta YI(YI_2-YI_1)$ is 1.0 or less, the long-term moist heat resistance of the molded body to be obtained is satisfactory, and when the $\Delta YI(YI_3-YI_1)$ is 3.0 or less, the long-term heat resistance thereof is judged to be satisfactory.

From the viewpoint of the long-term moist heat resistance of the molded body to be obtained, the $\Delta YI(YI_2-YI_1)$ is more preferably 0.8 or less, still more preferably 0.5 or less, still further more preferably 0.4 or less. In addition, from the viewpoint of the long-term heat resistance of the molded body to be obtained, the $\Delta YI(YI_3-YI_1)$ is more preferably 2.5 or less, still more preferably 2.0 or less.

The respective YI values may be specifically measured by a method described in Examples.

Further, the polycarbonate resin composition of the present invention has a peak intensity ratio in FT-IR measurement determined by the following method (1) of preferably 17.0 or less, more preferably 13.0 or less.

Method (1):

A flat plate-shaped test piece measuring 50 mm by 90 mm by 5 mm thick is produced through use of the polycarbonate resin composition by an injection molding method at a cylinder temperature of 280° C. and a die temperature of 80° C. for a cycle time of 50 seconds; the test piece is irradiated with LED light for 500 hours under the following LED irradiation conditions in a thermostat at 100° C.; after the LED irradiation, a LED light-irradiated portion of a surface of the test piece is subjected to FT-IR measurement by an attenuated total reflection method; and a ratio of a peak intensity at a wavenumber of 1,686 $cm^{-1}$ to a peak intensity at a wavenumber of 1,776 $cm^{-1}$ when an absorbance at a wavenumber of 1,950 $cm^{-1}$ in a FT-IR measurement chart in which an axis of ordinate indicates an absorbance and an axis of abscissa indicates a wavenumber is defined as a baseline is determined.

(LED Irradiation Conditions)

LED power: 10 W

LED irradiation intensity: 850 lm

LED irradiation distance: 1 mm

In the method (1), the FT-IR measurement may be performed with a microscopic FT-IR apparatus. A LED chip to be used in the LED irradiation is, for example, "OSW4XAHAE1E" manufactured by OptoSupply Limited. In addition, the LED irradiation distance refers to a distance from the surface of the test piece to a LED light source.

FIG. 1 is a reference graph for describing a peak intensity ratio in the FT-IR measurement of the polycarbonate resin composition determined by the method (1).

FIG. 1 is an example of a FT-IR measurement chart obtained by performing measurement on a flat plate-shaped test piece, which is produced through the use of the polycarbonate resin composition in accordance with the method (1), with a microscopic FT-IR apparatus by an attenuated total reflection (ATR) method. In FIG. 1, the FT-IR measurement chart of each of a test piece that is not irradiated with LED light and a test piece after 500 hours of LED irradiation, in which an axis of ordinate indicates an absorbance and an axis of abscissa indicates a wavenumber, is shown. In the polycarbonate resin composition, a polycarbonate resin whose main chain had a repeating unit represented by the formula (I) in which X represented an isopropylidene group was used as the aromatic polycarbonate resin (A).

In the FT-IR measurement chart after the 500 hours of LED irradiation, a peak at a wavenumber of 1,776 cm$^{-1}$ is a peak derived from the C=O stretching vibration of a carbonic acid ester of the polycarbonate resin, and a peak at a wavenumber of 1,686 cm$^{-1}$ is a peak occurring after the LED irradiation. As the peak intensity ratio (peak intensity at a wavenumber of 1,686 cm$^{-1}$/peak intensity at a wavenumber of 1,776 cm$^{-1}$) becomes smaller, the composition shows a smaller change due to the LED irradiation, and is hence more excellent in LED irradiation resistance. Although the reason why the peak at a wavenumber of 1,686 cm$^{-1}$ occurs after the LED irradiation is not clear, the peak that has occurred may be a peak derived from the C=O stretching vibration of an aromatic carboxylic acid ester compound or an aromatic ketone compound. Any such compound is assumed to be produced by the occurrence of not only photo Fries rearrangement but also the oxidation of the isopropylidene group of bisphenol A through irradiation with high-intensity LED light under a high-temperature environment.

The lower limit of the peak intensity ratio is a peak intensity ratio in the case where FT-IR measurement is similarly performed on a portion not irradiated with LED light. For example, when, in the polycarbonate resin composition, a polycarbonate resin whose main chain has a repeating unit represented by the formula (I) in which X represents an isopropylidene group is used as the aromatic polycarbonate resin (A), the lower limit of the peak intensity ratio is 5.5.

The peak intensity ratio may be specifically measured by a method described in Examples.

[Polycarbonate Resin Composition (II)]

The present invention also relates to the following polycarbonate resin composition.

A polycarbonate resin composition, including:

an aromatic polycarbonate resin (A);

an alicyclic epoxy compound (B);

one or more kinds of antioxidants (C) selected from the group consisting of a compound (C1) represented by the following formula (1):

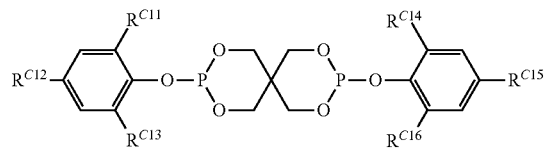

(1)

wherein in the formula (1), $R^{C11}$ to $R^{C16}$ each represent a hydrogen atom, or an aromatic ring-containing group having 6 or more and 15 or less carbon atoms, and may be identical to or different from each other, provided that not all of $R^{C11}$ to $R^{C16}$ represent hydrogen atoms, and a compound (C2) represented by the following formula (2):

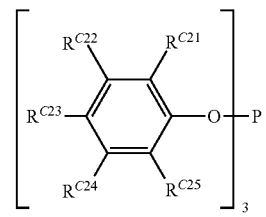

(2)

wherein in the formula (2), $R^{C21}$ to $R^{C25}$ each represent a hydrogen atom, an alkyl group having 1 or more and 12 or less carbon atoms, or an aryl group having 6 or more and 14 or less carbon atoms, and may be identical to or different from each other, provided that not all of $R^{C21}$ to $R^{C25}$ represent hydrogen atoms, and at least two of $R^{C21}$ to $R^{C25}$ each represent an alkyl group having 1 or more and 12 or less carbon atoms, or an aryl group having 6 or more and 14 or less carbon atoms; and one or more kinds of phosphorus compounds (D) selected from the group consisting of a compound (D1) represented by the following formula (3):

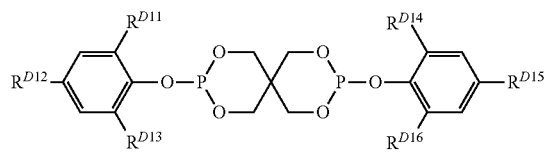

(3)

wherein in the formula (3), $R^{D11}$ to $R^{D16}$ each represent a hydrogen atom, or an alkyl group having 1 or more and 12 or less carbon atoms, and may be identical- or different from each other, provided that not all of $R^{D11}$ to $R^{D16}$ represent hydrogen atoms, and an arylphosphine (D2) except the component (C2), wherein the polycarbonate resin composition has a peak intensity ratio in FT-IR measurement determined by the following method (1) of 13.0 or less:

Method (1):

A flat plate-shaped test piece measuring 50 mm by 90 mm by 5 mm thick is produced through use of the polycarbonate resin composition by an injection molding method at a cylinder temperature of 280° C. and a die temperature of 80° C. for a cycle time of 50 seconds; the test piece is irradiated with LED light for 500 hours under the following LED irradiation conditions in a thermostat at 100° C.; after the LED irradiation, a LED light-irradiated portion of a surface of the test piece is subjected to FT-IR measurement by an attenuated total reflection method; and a ratio of a peak intensity at a wavenumber of 1,686 cm$^{-1}$ to a peak intensity at a wavenumber of 1,776 cm$^{-1}$ when an absorbance at a wavenumber of 1,950 cm$^{-1}$ in a FT-IR measurement chart in which an axis of ordinate indicates an absorbance and an axis of abscissa indicates a wavenumber is defined as a baseline is determined.

(LED Irradiation Conditions)

LED power: 10 W

LED irradiation intensity: 850 lm

LED irradiation distance: 1 mm

The polycarbonate resin composition (II) has the above-mentioned construction, and hence provides a molded body having the following feature: even when the molded body is irradiated with light from a LED or the like for a long time period in, for example, the application of a DRL for a vehicle, the molded body hardly deteriorates, and is hence excellent in LED irradiation resistance.

The aromatic polycarbonate resin (A), the alicyclic epoxy compound (B), the antioxidants (C), the phosphorus compounds (D), and any other component to be incorporated into the polycarbonate resin composition (II), and suitable ranges of their contents are the same as those of the polycarbonate resin composition (I).

That is, in the polycarbonate resin composition (II), with respect to 100 parts by mass of the component (A), the content of the component (B) is preferably 0.01 part by mass or more and 0.1 part by mass or less, the content of the component (C) is preferably 0.01 part by mass or more and 0.1 part by mass or less, and the content of the component (D) is preferably 0.01 part by mass or more and 0.05 part by mass or less.

In addition, the peak intensity ratio of the composition by the method (1) may be determined by the same method as that described in the foregoing, and may be specifically measured by the method described in Examples.

[Molded Body]

A molded body of the present invention includes the polycarbonate resin composition of the present invention described above. The molded article may be produced through the use of a melt-kneaded product of the polycarbonate resin composition or a pellet thereof obtained through melting and kneading as a raw material by an injection molding method, an injection compression molding method, an extrusion molding method, a blow molding method, a press molding method, a vacuum molding method, an expansion molding method, or the like. In particular, the molded article is preferably produced through the use of the resultant pellet by an injection molding method or an injection compression molding method. Although a molding temperature is not particularly limited, for example, the composition may be molded at a temperature of 240° C. or more and 300° C. or less.

The molded article of the present invention has a satisfactory initial color tone, and is excellent in long-term moist heat resistance and long-term heat resistance. Accordingly, in order to utilize the features, the molded article is preferably a light-guiding part.

The light-guiding part may be, for example, a light-guiding part for a vehicle, and is particularly preferably a light-guiding part for a vehicle daytime running light (DRL).

EXAMPLES

The present invention is described more specifically by way of Examples below, but the present invention is not limited to these Examples.

[Measurement of Viscosity-Average Molecular Weight (Mv)]

A viscosity-average molecular weight (Mv) was calculated from the following equation (Schnell's equation) after the determination of a limiting viscosity [η] through the measurement of the viscosity of a methylene chloride solution (concentration: g/l) at 20° C. with an Ubbelohde-type viscometer.

$$[\eta]=1.23\times10^{-5}Mv^{0.83}$$

Components used in Examples and Comparative Examples are as described below.

<Aromatic Polycarbonate Resin (A)>

(A1): "TARFLON FN1500" (manufactured by Formosa Idemitsu Petrochemical Corporation, bisphenol A polycarbonate resin, viscosity-average molecular weight (Mv)=14,200)

(A2): "TARFLON FN1700" (manufactured by Formosa Idemitsu Petrochemical Corporation, bisphenol A polycarbonate resin, viscosity-average molecular weight (Mv)=17,700)

<Alicyclic Epoxy Compound (B)>

(B1): "CELLOXIDE 2021P" (manufactured by Daicel Corporation, 3',4'-epoxycyclohexylmethyl-3,4-epoxycyclohexane carboxylate)

<Antioxidant (C)>

(C1-1): "Doverphos S-9228PC" (manufactured by Dover Chemical Corporation, bis(2,4-dicumylphenyl)pentaerythritol diphosphite)

(C2-1): "IRGAFOS 168" (manufactured by BASF, tris(2,4-di-tert-butylphenyl)phosphite)

<Phosphorus Compound (D)>

(D1-1): "ADK STAB PEP-36" (manufactured by ADEKA Corporation, bis(2,6-di-tert-butyl-4-methylphenyl) pentaerythritol diphosphite)

(D2-1): "JC-263" (manufactured by Johoku Chemical Co., Ltd., triphenylphosphine)

<Fatty Acid Ester (E)>

(E1): "S-100A" (manufactured by Riken Vitamin Co., Ltd., glycerin monostearate)

<UV Absorber (F)>

(F1): "CYASORB UV-3638F" (manufactured by Cytec Industries, 2,2'-(1,4-phenylene)bis[4H-3,1-benzoxazin-4-one])

<Other Additive>

"KR-511" (manufactured by Shin-Etsu Chemical Co., Ltd., polyorganosiloxane compound, kinematic viscosity (25° C.): 90 mm$^2$/s, refractive index: 1.518)

Examples 1 to 21 and Comparative Examples 1 to 9

In the respective examples, the respective components were blended at amount ratios shown in Tables 1 and 2 to prepare polycarbonate resin compositions. The polycarbonate resin compositions were each melted and kneaded with a vented single-screw extruder having a screw diameter of 40 mm ("VS-40" manufactured by Tanabe Plastics Machinery Co., Ltd.) at a cylinder temperature of 250° C., and the melt-kneaded product was subjected to strand cutting to provide a pellet. The resultant pellet was dried at 110° C. for 5 hours, and then a molded body was produced and subjected to various evaluations by the following methods.

[Initial YI value of Molded Body]

The pellet after the drying was molded into a flat plate-shaped test piece (molded body (1)) measuring 50 mm by 90 mm by 5 mm thick with an injection molding machine ("ES-1000" manufactured by Nissei Plastic Industrial Co., Ltd.) by an injection molding method at a cylinder temperature of 280° C. and a die temperature of 80° C. for a cycle time of 50 seconds.

The YI value (initial YI value: $YI_1$) of the resultant test piece was measured with a spectrophotometer ("U-4100" manufactured by Hitachi High-Technologies Corporation) under the conditions of a C light source and a two-degree field of view. The results are shown in the tables. An acceptance criterion is as follows: the $YI_1$ is less than 1.2.

[Moist Heat Resistance Test of Molded Body]

The flat plate-shaped test piece after the $YI_1$ measurement was loaded into a thermohygrostat ("LH33-12P" manufactured by Nagano Science Co., Ltd.) set to a temperature of 85° C. and a relative humidity of 85% for 1,000 hours. The YI value ($YI_2$) of the test piece after the test was measured in the same manner as that described above, and $\Delta YI(YI_2-YI_1)$ was determined. The results are shown in the tables. The acceptance criterion of the moist heat resistance test is as follows: the $\Delta YI(YI_2-YI_1)$ is 1.0 or less.

[Heat Resistance Test of Molded Body]

In addition, the flat plate-shaped test piece after the $YI_1$ measurement was loaded into a Geer oven ("GPS-222" manufactured by Tabai Espec Co., Ltd.) adjusted to a temperature of 140° C. for 1,000 hours. The YI value ($YI_3$) of the test piece after the test was measured in the same manner as that described above, and $\Delta YI(YI_3-YI_1)$ was determined. The results are shown in the tables. The acceptance criterion of the heat resistance test is as follows: the $\Delta YI(YI_3-YI_1)$ is 3.0 or less.

[LED Irradiation Resistance Test of Molded Body]

The flat plate-shaped test piece (molded body (1)) measuring 50 mm by 90 mm by 5 mm thick produced by the foregoing method was irradiated with LED light for 500 hours under the following LED irradiation conditions in a thermostat at 100° C. In the LED irradiation, "OSW4XAHAE1E" manufactured by OptoSupply Limited was used as a LED chip.

(LED Irradiation Conditions)

LED power: 10 W (1 A×10 V)
LED irradiation intensity: 850 lm
LED irradiation distance: 1 mm After the LED irradiation, the LED light-irradiated portion of the surface of the flat plate-shaped test piece was subjected to FT-IR measurement under the following conditions.

(FT-IR Measurement)

Apparatus: A microscopic FT-IR apparatus (manufactured by Thermo Fisher Scientific K.K., model: Nicolet 8700 (IR irradiation portion), CONTINUUM (microscopic portion)).

Measurement method: An attenuated total reflection method (ATR)

Measurement wavenumber range: 650 $cm^{-1}$ to 4,000 $cm^{-1}$

Resolution: 4 $cm^{-1}$

Measurement conditions: An infrared ray is applied by using a germanium crystal at an incident angle of 29°.

Measurement range: A range measuring about 100 μm by about 100 μm at the center of the LED light-irradiated portion of the flat plate-shaped test piece (molded body (1))

Number of scans: 200 times

The ratio (peak intensity at a wavenumber of 1,686 $cm^{-1}$/peak intensity at a wavenumber of 1,776 $cm^{-1}$) of a peak intensity at a wavenumber of 1,686 $cm^{-1}$ to a peak intensity at a wavenumber of 1,776 $cm^{-1}$ when an absorbance at a wavenumber of 1,950 $cm^{-1}$ in the resultant FT-IR measurement chart in which an axis of ordinate indicated an absorbance and an axis of abscissa indicated a wavenumber was defined as a baseline was determined, and was evaluated by the following criteria.

A: The peak intensity ratio is 13.0 or less.
B: The peak intensity ratio is more than 13.0 and 17.0 or less.
C: The peak intensity ratio is more than 17.0.

TABLE 1

| | | | Example | | | | | | | | | | |
|---|---|---|---|---|---|---|---|---|---|---|---|---|---|
| | | | 1 | 2 | 3 | 4 | 5 | 6 | 7 | 8 | 9 | 10 | 11 |
| Composition (part(s) by mass) | (A1) FN1500 | | 100 | 100 | 100 | 100 | 100 | 100 | 100 | 100 | 100 | 100 | 100 |
| | (A2) FN1700 | | | | | | | | | | | | |
| | (B1) CELLOXIDE 2021P | | 0.01 | 0.03 | 0.05 | 0.03 | 0.03 | 0.03 | 0.03 | 0.03 | 0.03 | 0.03 | 0.03 |
| | (C1-1) Doverphos S-9228PC | | 0.025 | 0.025 | 0.025 | 0.04 | 0.025 | 0.025 | 0.025 | 0.04 | 0.025 | 0.04 | |
| | (C2-1) IRGAFOS168 | | | | | | | | | | | | |
| | (D1-1) ADK STAB PEP-36 | | 0.025 | 0.025 | 0.025 | 0.01 | 0.01 | | 0.01 | | 0.025 | 0.01 | |
| | (D2-1) JC-263 | | | | | | | 0.025 | | 0.01 | | | 0.025 |
| | (E1) S-100A | | | | | | | | | | | | |
| | (F1) CYASORB UV-3638F KR-511 | | | | | | | | | | | | |
| Evaluation result | Mv | | 14,200 | 14,200 | 14,200 | 14,200 | 14,200 | 14,200 | 14,200 | 14,200 | 14,200 | 14,200 | 14,200 |
| | Initial YI value | YI value after molding at 280° C. (YI$_1$) | 1.0 | 1.0 | 1.0 | 1.0 | 1.1 | 1.0 | 1.1 | 1.0 | 1.0 | 1.1 | 1.1 |
| | Moist heat resistance | YI value after storage at 85° C. and 85% RH for 1,000 hr (YI$_2$) | 1.1 | 1.1 | 1.1 | 1.2 | 1.3 | 1.1 | 1.3 | 1.3 | 1.0 | 1.1 | 1.2 |
| | | ΔYI (YI$_2$-YI$_1$) | 0.1 | 0.1 | 0.1 | 0.2 | 0.2 | 0.1 | 0.2 | 0.3 | 0.0 | 0.0 | 0.1 |
| | Heat resistance | YI value after storage at 140° C. for 1,000 hr (YI$_3$) | 3.4 | 3.4 | 3.4 | 2.2 | 2.2 | 4.0 | 2.1 | 1.5 | 3.3 | 2.3 | 4.0 |
| | | ΔYI (YI$_3$-YI$_1$) | 2.4 | 2.4 | 2.4 | 1.2 | 1.1 | 3.0 | 1.0 | 0.5 | 2.3 | 1.2 | 2.9 |
| | LED irradiation resistance | IR peak intensity ratio | 13.0 | 12.2 | 10.6 | 12.0 | 9.2 | 15.6 | 11.0 | 11.2 | 11.0 | 10.7 | 16.2 |
| | | Evaluation | A | A | A | A | A | B | A | A | A | A | B |

TABLE 1-continued

| Composition (part(s) by mass) | | 12 | 13 | 14 | 15 | 16 | 17 | 18 | 19 | 20 | 21 |
|---|---|---|---|---|---|---|---|---|---|---|---|
| | (A1) FN1500 | 100 | 100 | 100 | 100 | 100 | 100 | 100 | 100 | 100 | 100 |
| | (A2) FN1700 | | | | | | | | | | |
| | (B1) CELLOXIDE 2021P | 0.03 | 0.03 | 0.03 | 0.03 | 0.01 | 0.1 | 0.03 | 0.03 | 0.03 | 0.05 |
| | (C1-1) Doverphos S-9228PC | 0.025 | 0.025 | 0.025 | 0.025 | 0.04 | 0.04 | 0.08 | 0.09 | 0.08 | 0.02 |
| | (C2-1) IRGAFOS168 | | | | | | | | | | |
| | (D1-1) ADK STAB PEP-36 | 0.025 | 0.025 | 0.025 | 0.025 | 0.01 | 0.01 | 0.02 | 0.01 | | 0.01 |
| | (D2-1) JC-263 | | 0.05 | 0.1 | | | | | | 0.02 | |
| | (E1) S-100A | | | | 0.05 | | | | | | |
| | (F1) CYASORB UV-3638F | | | | | | | | | | |
| | KR-511 | | | | | | | | | | |
| | Mv | 17.700 | 14.200 | 14.200 | 14.200 | 14.200 | 14.200 | 14.200 | 14.200 | 14.200 | 14.200 |
| Evaluation result | Initial YI value after molding at 280° C. (YI₁) | 1.0 | 1.0 | 1.1 | 1.1 | 1.0 | 1.0 | 1.0 | 1.0 | 1.0 | 1.0 |
| | Moist heat resistance YI value after storage at 85° C. and 85% RH for 1,000 hr (YI₂) | 1.1 | 1.1 | 1.3 | 1.3 | 1.2 | 1.2 | 1.2 | 1.2 | 1.3 | 1.1 |
| | ΔYI (YI₂-YI₁) | 0.1 | 0.1 | 0.2 | 0.2 | 0.2 | 0.2 | 0.2 | 0.2 | 0.3 | 0.1 |
| | Heat resistance YI value after storage at 140° C. for 1,000 hr (YI₃) | 3.0 | 3.5 | 4.0 | 4.0 | 2.5 | 2.2 | 3.5 | 2.4 | 2.0 | 3.5 |
| | ΔYI (YI₃-YI₁) | 2.0 | 2.5 | 2.9 | 2.9 | 1.5 | 1.2 | 2.5 | 1.4 | 1.0 | 2.5 |
| | LED irradiation resistance IR peak intensity ratio | 9.7 | 10.2 | 16.2 | 10.8 | 10.9 | 10.2 | 16.3 | 15.5 | 16.8 | 8.9 |
| | Evaluation | A | A | B | A | A | A | B | B | B | A |

TABLE 2

| | | Comparative Example | | | | | | | | |
|---|---|---|---|---|---|---|---|---|---|---|
| | | 1 | 2 | 3 | 4 | 5 | 6 | 7 | 8 | 9 |
| Composition (part(s) by mass) | (A1) FN1500 | 100 | 100 | 100 | 100 | 100 | 100 | 100 | 100 | 100 |
| | (A2) FN1700 | | | | | | | | | |
| | (B1) CELLOXIDE 2021P | | 0.03 | | | | | 0.03 | 0.03 | 0.03 |
| | (C1-1) Doverphos S-9228PC | | | 0.05 | | 0.025 | | | 0.05 | |
| | (C2-1) IRGAFOS168 | | | | 0.05 | | 0.025 | | | 0.05 |
| | (D1-1) ADK STAB PEP-36 | 0.05 | 0.05 | | | 0.025 | 0.025 | | | |
| | (D2-1) JC-263 | | | | | | | 0.05 | | |
| Evaluation result | Mv | 14,200 | 14,200 | 14,200 | 14,200 | 14,200 | 14,200 | 14,200 | 14,200 | 14,200 |
| | Initial YI value — YI value after molding at 280° C. ($YI_1$) | 1.0 | 1.0 | 1.2 | 1.3 | 1.1 | 1.0 | 1.1 | 1.2 | 1.3 |
| | Moist heat resistance — YI value after storage at 85° C. and 85% RH for 1,000 hr ($YI_2$) | 3.9 | 1.0 | 1.7 | 1.5 | 3.3 | 1.7 | 1.1 | 1.3 | 1.4 |
| | $\Delta YI(YI_2-YI_1)$ | 2.9 | 0.0 | 0.5 | 0.2 | 2.2 | 0.7 | 0.0 | 0.1 | 0.1 |
| | Heat resistance — YI value after storage at 140° C. for 1,000 hr ($YI_3$) | 21.1 | 5.7 | 7.0 | 6.8 | 5.9 | 6.2 | 4.5 | 1.7 | 2.4 |
| | $\Delta YI(YI_3-YI_1)$ | 20.1 | 4.7 | 5.8 | 5.5 | 4.8 | 5.2 | 3.4 | 0.5 | 1.1 |
| | LED irradiation resistance — IR peak intensity ratio | 15.9 | 12.3 | 16.3 | 14.9 | 15.8 | 15.2 | 21.8 | 11.6 | 12.1 |
| | Evaluation | B | A | B | A | B | B | C | A | A |

As shown in Table 1, the polycarbonate resin composition of the present invention including the predetermined components (A) to (D) has a low initial YI value after its molding at low temperature (280° C.), and is excellent in long-term moist heat resistance and long-term heat resistance. In addition, its LED irradiation resistance is also excellent.

In contrast, as shown in Table 2, in Comparative Example 1 free of the components (B) and (C), the initial YI value was satisfactory, but the long-term moist heat resistance and the long-term heat resistance were low. In each of Comparative Examples 2 and 7 each of which was free of the component (C), the initial YI value and the moist heat resistance were satisfactory, but the YI value after the long-term heat resistance test at 140° C. increased. In each of Comparative Examples 3 and 4 each of which was free of the components (B) and (D), the initial YI value increased, and the long-term heat resistance reduced.

In each of Comparative Examples 5 and 6 each of which was free of the component (B), the initial YI value satisfied the acceptance criterion. However, in Comparative Example 5 in which the component (C) was used as the component (C), the long-term moist heat resistance and the long-term heat resistance were low, and in Comparative Example 6 in which the component (C2) was used as the component (C), the long-term heat resistance reduced. In each of Comparative Examples 8 and 9 each of which was free of the component (D), the initial YI value was high, and hence did not satisfy the acceptance criterion.

Among the polycarbonate resin compositions of Table 2, Comparative Example 2 is a resin composition corresponding to the invention disclosed in PTL 1 except that the composition is free of any acrylic resin. In addition, Comparative Example 7 is a resin composition corresponding to the invention disclosed in PTL 2, Comparative Example 8 is a resin composition corresponding to the invention disclosed in PTL 3, and Comparative Example 6 is a resin composition corresponding to the invention disclosed in PTL 3.

INDUSTRIAL APPLICABILITY

The molded body formed of the polycarbonate resin composition of the present invention has a satisfactory initial color tone after molding at a temperature as low as 280° C. or less, is excellent in long-term moist heat resistance, and has satisfactory long-term heat resistance at a temperature near the glass transition point of the polycarbonate resin. The molded body is suitable as a light-guiding part for a vehicle and various light-guiding plates.

The invention claimed is:

1. A polycarbonate resin composition (I-1) or (I-2), wherein the polycarbonate resin composition (I-1) comprises:
   an aromatic polycarbonate resin (A);
   an alicyclic epoxy compound (B);
   an antioxidant (C), which is a compound (C1) represented by the following formula (1); and
   one or more kinds of phosphorus compounds (D) selected from the group consisting of a compound (D1) represented by the following formula (3) and an arylphosphine (D2) except a compound (C2) represented by the following formula (2);
   wherein, with respect to 100 parts by mass of the component (A), a content of the component (B) is 0.01 part by mass or more and 0.1 part by mass or less, a content of the component (C) is 0.01 part by mass or more and 0.1 part by mass or less, a content of the component (D) is 0.01 part by mass or more and 0.05 part by mass or less and a total content of the component (C) and the component (D) is 0.05 part by mass or less
   or wherein the polycarbonate resin composition (I-2) comprises:
   an aromatic polycarbonate resin (A);
   an alicyclic epoxy compound (B);
   an antioxidant (C), which is a compound (C2) represented by the following formula (2); and
   one or more kinds of phosphorus compounds (D) selected from the group consisting of a compound (D1) represented by the following formula (3) and an arylphosphine (D2) except the component (C2),
   wherein with respect to 100 parts by mass of the component (A), a content of the component (B) is 0.01 part by mass or more and 0.1 part by mass or less, a content of the component (C) is 0.01 part by mass or more and 0.1 part by mass or less, a content of the component (D) is 0.01 part by mass or more and 0.05 part by mass or less and a total content of the component (C) and the component (D) is 0.035 part by mass or less:

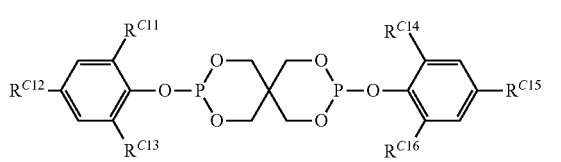
(1)

wherein
in the formula (1), $R^{C11}$ to $R^{C16}$ each represent a hydrogen atom, or an aromatic ring-containing group having 6 or more and 15 or less carbon atoms, and may be identical to or different from each other, provided that not all of $R^{C11}$ to $R^{C16}$ represent hydrogen atoms;

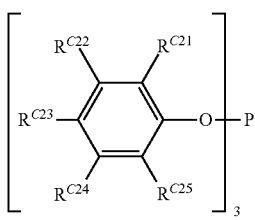
(2)

wherein
in the formula (2), $R^{C21}$ to $R^{C25}$ each represent a hydrogen atom, an alkyl group having 1 or more and 12 or less carbon atoms, or an aryl group having 6 or more and 14 or less carbon atoms, and may be identical to or different from each other, provided that not all of $R^{C21}$ to $R^{C25}$ represent hydrogen atoms, and at least two of $R^{C21}$ to $R^{C25}$ each represent an alkyl group having 1 or more and 12 or less carbon atoms, or an aryl group having 6 or more and 14 or less carbon atoms; and wherein

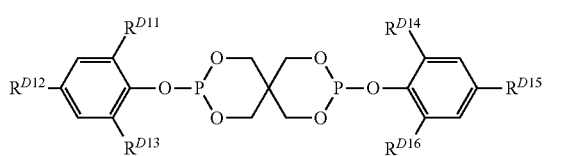
(3)

in the formula (3), $R^{D11}$ to $R^{D16}$ each represent a hydrogen atom, or an alkyl group having 1 or more and 12 or less carbon atoms, and may be identical to or different from each other, provided that not all of $R^{D11}$ to $R^{D16}$ represent hydrogen atoms.

2. The polycarbonate resin composition according to claim 1, wherein a molded body (1) having a thickness of 5 mm, which is produced through use of the polycarbonate resin composition by an injection molding method at a cylinder temperature of 280° C. and a die temperature of 80° C. for a cycle time of 50 seconds, has an initial YI value $YI_1$, which is measured under conditions of a C light source and a two-degree field of view with a spectrophotometer, of less than 1.2.

3. The polycarbonate resin composition according to claim 2, wherein when a YI value after the molded body (1) has been stored under an environment at 85° C. and a humidity of 85% for 1,000 hours is represented by $YI_2$, $\Delta YI(YI_2-YI_1)$ is 1.0 or less, and when a YI value after the molded body (1) has been stored at 140° C. for 1,000 hours is represented by $YI_3$, $\Delta YI(YI_3-YI_1)$ is 3.0 or less.

4. The polycarbonate resin composition according to claim 1, wherein the component (B) comprises 3',4'-epoxycyclohexylmethyl-3,4-epoxycyclohexane carboxylate.

5. The polycarbonate resin composition according to claim 1, wherein the component (C1) comprises bis(2,4-dicumylphenyl)pentaerythritol diphosphite.

6. The polycarbonate resin composition according to claim 1, wherein the component (C2) comprises tris(2,4-di-tert-butylphenyl)phosphite.

7. The polycarbonate resin composition according to claim 1, wherein the component (D1) comprises bis(2,6-di-tert-butyl-4-methylphenyl)pentaerythritol diphosphite.

8. The polycarbonate resin composition according to claim 1, wherein the component (D2) comprises triphenylphosphine.

9. The polycarbonate resin composition according to claim 1, wherein the component (C) comprises the component (C1), and the component (D) comprises the component (D1).

10. The polycarbonate resin composition according to claim 9, wherein the component (C1) comprises bis(2,4-dicumylphenyl)pentaerythritol diphosphite, and the component (D1) comprises bis(2,6-di-tert-butyl-4-methylphenyl) pentaerythritol diphosphite.

11. The polycarbonate resin composition according to claim 1, wherein a content ratio [(C)/(D)] of the component (C) to the component (D) is 0.2 or more and 10 or less in terms of mass ratio.

12. The polycarbonate resin composition according to claim 1, further comprising a fatty acid ester (E).

13. The polycarbonate resin composition according to claim 1, further comprising a UV absorber (F).

14. A polycarbonate resin composition (II-1) or (II-2), wherein the polycarbonate resin composition (II-1) comprises
an aromatic polycarbonate resin (A);
an alicyclic epoxy compound (B);
an antioxidant (C), which is
a compound (C1) represented by the following formula (1) and
one or more kinds of phosphorus compounds (D) selected from the group consisting of a compound (D1) represented by the following formula (3) and
an arylphosphine (D2) except a compound (C2) represented by the following formula (2)
wherein a total content of the component (C) and the component (D) is 0.05 part by mass or less;
or
wherein the polycarbonate resin composition (II-2) comprises:
an aromatic polycarbonate resin (A);
an alicyclic epoxy compound (B);
an antioxidant (C), which is a compound (C2) represented by the following formula (2):

and
one or more kinds of phosphorus compounds (D) selected from the group consisting of
a compound (D1) represented by the following formula (3)
and
an arylphosphine (D2) except the component (C2), wherein a total content of the component (C) and the component (D) is 0.035 part by mass or less:
wherein

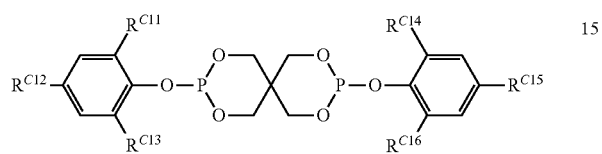

(1)

in the formula (1), $R^{C11}$ to $R^{C16}$ each represent a hydrogen atom, or an aromatic ring-containing group having 6 or more and 15 or less carbon atoms, and may be identical to or different from each other, provided that not all of $R^{C11}$ to $R^{C16}$ represent hydrogen atoms,
wherein

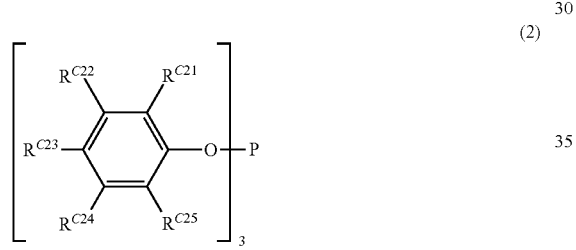

(2)

in the formula (2), $R^{C21}$ to $R^{C25}$ each represent a hydrogen atom, an alkyl group having 1 or more and 12 or less carbon atoms, or an aryl group having 6 or more and 14 or less carbon atoms, and may be identical to or different from each other, provided that not all of $R^{C21}$ to $R^{C25}$ represent hydrogen atoms, and at least two of $R^{C21}$ to $R^{C25}$ each represent an alkyl group having 1 or more and 12 or less carbon atoms, or an aryl group having 6 or more and 14 or less carbon atoms; and wherein

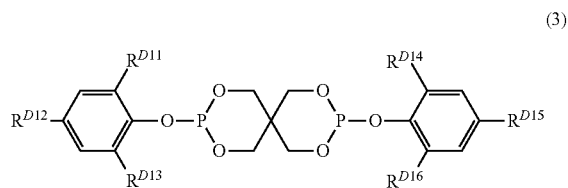

(3)

in the formula (3), $R^{D11}$ to $R^{D16}$ each represent a hydrogen atom, or an alkyl group having 1 or more and 12 or less carbon atoms, and may be identical to or different from each other, provided that not all of $R^{D11}$ to $R^{D16}$ represent hydrogen atoms, and
wherein the polycarbonate resin composition (II-1) or (II-2) has a peak intensity ratio in FT-IR measurement determined by the following method (1) of 13.0 or less:
Method (1):
A flat plate-shaped test piece measuring 50 mm by 90 mm by 5 mm thick is produced through use of the polycarbonate resin composition by an injection molding method at a cylinder temperature of 280° C. and a die temperature of 80° C. for a cycle time of 50 seconds; the test piece is irradiated with LED light for 500 hours under the following LED irradiation conditions in a thermostat at 100° C.; after the LED irradiation, a LED light-irradiated portion of a surface of the test piece is subjected to FT-IR measurement by an attenuated total reflection method; and a ratio of a peak intensity at a wavenumber of 1,686 $cm^{-1}$ to a peak intensity at a wavenumber of 1,776 $cm^{-1}$ when an absorbance at a wavenumber of 1,950 $cm^{-1}$ in a FT-IR measurement chart in which an axis of ordinate indicates an absorbance and an axis of abscissa indicates a wavenumber is defined as a baseline is determined:
(LED irradiation conditions)
LED power: 10 W
LED irradiation intensity: 850 lm
LED irradiation distance: 1 mm.
15. A molded body, comprising the polycarbonate resin composition of claim 1.
16. The molded body according to claim 15, wherein the molded body comprises a light-guiding part.
17. The molded body according to claim 16, wherein the molded body comprises a light-guiding part for a vehicle.

* * * * *